(12) United States Patent
Mehr

(10) Patent No.: US 10,530,887 B1
(45) Date of Patent: Jan. 7, 2020

(54) PRE-CACHING DATA FOR USE UPON EXECUTION OF PROGRAM CODE

(71) Applicant: Amazon Technologies, Inc., Seattle, WA (US)

(72) Inventor: Nima Sharifi Mehr, Vancouver (CA)

(73) Assignee: AMAZON TECHNOLOGIES, INC., Seattle, WA (US)

(*) Notice: Subject to any disclaimer, the term of this patent is extended or adjusted under 35 U.S.C. 154(b) by 165 days.

(21) Appl. No.: 15/371,107

(22) Filed: Dec. 6, 2016

(51) Int. Cl.
*G06F 15/16* (2006.01)
*H04L 29/08* (2006.01)
*H04L 29/06* (2006.01)

(52) U.S. Cl.
CPC ......... *H04L 67/2847* (2013.01); *H04L 67/42* (2013.01)

(58) Field of Classification Search
USPC ............... 709/203, 229, 212, 213, 214, 219
See application file for complete search history.

(56) References Cited

U.S. PATENT DOCUMENTS

| 6,665,867 B1* | 12/2003 | Ims | H04L 67/34 717/173 |
| 2013/0339379 A1* | 12/2013 | Ferrari | G06F 17/30595 707/766 |
| 2015/0331633 A1* | 11/2015 | Yang | G06F 17/30902 711/119 |
| 2017/0091269 A1* | 3/2017 | Zhu | G06F 17/30442 |
| 2017/0142129 A1* | 5/2017 | Peng | H04L 47/72 |

\* cited by examiner

*Primary Examiner* — Lan Dai T Truong
(74) *Attorney, Agent, or Firm* — Quarles & Brady LLP

(57) ABSTRACT

Systems for processing requests to execute a program code of a user use a message queue service to store requests when there are not enough resources to process the requests. The message queue service determines whether a request to be queued is associated with data that the program code needs in order to process the request. If so, the message queue service locates and retrieves the data and stores the data in a cache storage that provides faster access by the program code to the pre-fetched data. This provides faster execution of asynchronous instances of the program code.

16 Claims, 11 Drawing Sheets

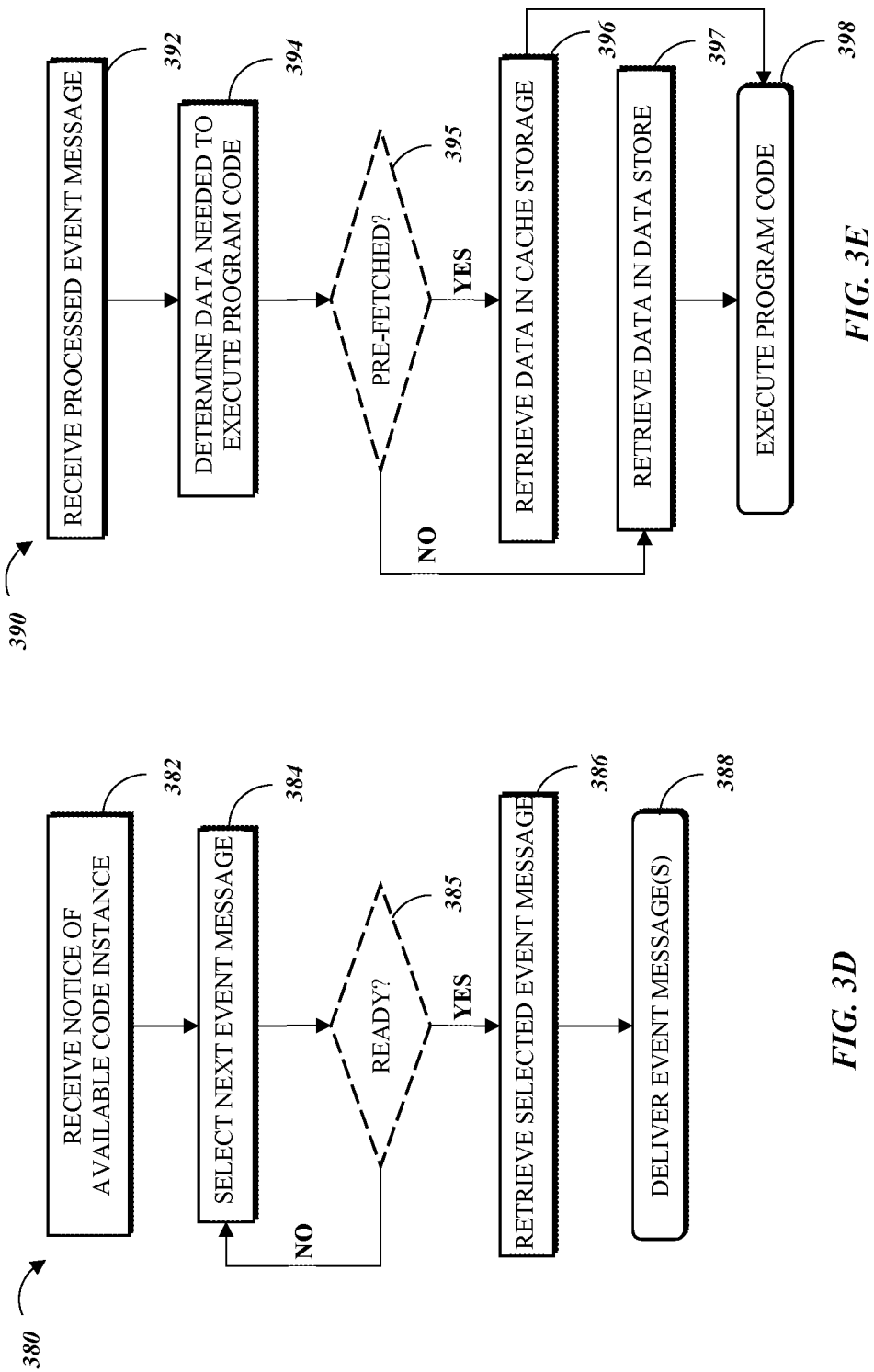

PRE-CACHING DATA FOR USE UPON EXECUTION OF PROGRAM CODE

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf, or for the benefit of, the general public.

To facilitate increased utilization of data center resources, virtualization technologies may allow a single physical computing device to host one or more instances of virtual machines that appear and operate as independent computing devices to users of a data center. The single physical computing device can create, maintain, delete, or otherwise manage virtual machines in a dynamic manner. In some scenarios, various computing devices may be associated with different combinations of operating systems or operating system configurations, virtualized hardware resources and software applications to enable a computing device to provide different desired functionalities, or to provide similar functionalities more efficiently. Further, virtual machines can themselves be partitioned into multiple isolated virtual systems, called "containers." The virtual machine controls allocation of resources such as processing power and memory, and each container has its own process and network space in which the container can, for example, execute software programs.

In turn, users can request computer resources from a data center, including single computing devices or a configuration of networked computing devices, and be provided with varying numbers of virtual machine resources. In a computing environment, a user's access to resources can be limited based presently available resources, a service level, a maximum bandwidth, etc. For example, a user may be limited to a certain number of concurrently-instantiated virtual machines. Consequently, when a request is to allocate resources to execute a software program, it is beneficial to minimize the execution time in order to make the resources available again as soon as possible. If a request to allocate more resources arrives while the maximum resources are allocated, the request may be placed in a queue and then processed (e.g., after earlier queued requests) when resources come available.

BRIEF DESCRIPTION OF THE DRAWINGS

The detailed description is set forth with reference to the accompanying figures. The use of the same reference numbers in different figures indicates similar or identical items or features.

FIG. 3D is a flow diagram of an exemplary method for delivering queued event messages, in accordance with the present disclosure;

FIG. 3E is an exemplary method for processing event messages with pre-fetched data, in accordance with the present disclosure;

DETAILED DESCRIPTION

Figure 1:
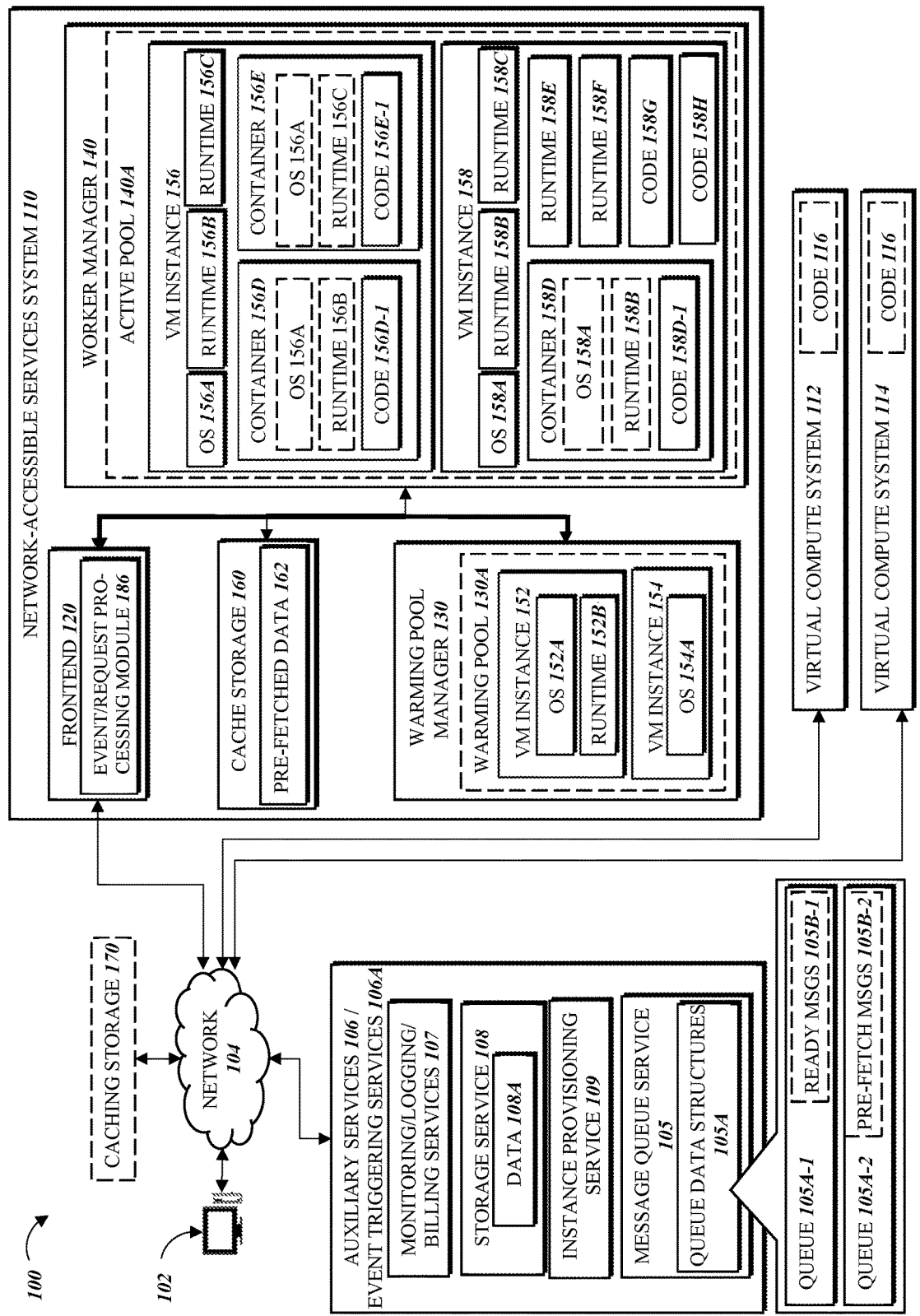
FIG. 1 is a diagram illustrating an exemplary system for retrieving and caching data related to queued event messages, in accordance with the present disclosure.

Developers that use computing environments, such as a virtual private cloud, to perform computing operations (e.g., execute code, including threads, programs, software, routines, subroutines, processes, etc.) are faced with difficulties in selecting and customizing the proper type, size, number, and duration of compute resources in accordance with their needs. Other concerns that they might have include over-utilization (e.g., acquiring too little computing resources and suffering performance issues), under-utilization (e.g., acquiring more computing resources than necessary to run the codes, and thus overpaying), prediction of change in traffic (e.g., so that they know when to scale up or down), and instance and language runtime startup delay, which can take 3-10 minutes, or longer, even though users may desire computing capacity on the order of seconds or even milliseconds. Additionally, the developer may be faced with demands for fair or prioritized resource allocation, such as when a single user submits bulk or high-frequency requests in excess of the developer's limits, inhibiting the processing of other users' requests. Thus, an improved method of allowing users to take advantage of the virtual machine instances provided by service providers is desired.

A system can maintain a pool of pre-initialized virtual machine instances that are ready for use as soon as a user request is received, as described in the present disclosure. Specifically, a network-accessible services system maintains a pool of virtual machine instances that have one or more software components (e.g., operating systems, language runtimes, libraries, etc.) loaded thereon. The virtual machine instances in the pool can be designated to service user requests to execute program codes. The program codes can be executed in isolated containers that are created on the virtual machine instances. Since the virtual machine instances in the pool have already been booted and loaded with particular operating systems and language runtimes by the time the requests are received, the delay associated with finding compute capacity that can handle the requests (e.g., by executing the user code in one or more containers created on the virtual machine instances) is significantly reduced.

In certain embodiments, elements of the system facilitate transportation or communication of event messages generated in a first programmatic environment (e.g., at an auxiliary service) to the programmatic environment provided by the network-accessible services system described herein. To further facilitate propagation and transportation of a triggered event from the first programmatic environment to the network-accessible services system, event messages may be generated to include information descriptive of the triggered event, a user associated with a request to execute user code in response to the triggered event, and programmatic information to enable the network-accessible services system to convert the event message into a user request for further processing by the network-accessible services system. The event message and/or programmatic information contained therein may be structured according to a schema, a code model, or an application programming interface ("API") to facilitate both creation/generation of the event message at the auxiliary service and conversion/processing of the event message at the network-accessible services system.

In this manner, the system performs an automatic rate matching and scaling between events being triggered on an auxiliary service and the corresponding execution of user code on various virtual machine instances. Thus, the network-accessible services system is capable of responding to events on-demand, whether the events are triggered infrequently (e.g., once per day) or on a larger scale (e.g., hundreds or thousands per second). However, various considerations may create a need to impose limitations on the immediate availability of virtual machine instances. For example, the physical computing devices that implement the network-accessible services system may reach capacity, having allocated all available resources. In another example, the network-accessible services system's users may have service agreements that limit access to resources. The network-accessible services system may implement a resource allocation limit, such as a limit on concurrently instantiated virtual machines by the user, or on concurrent executions of the user's program code. Since they are processed asynchronously, requests for the program code (i.e., event messages) that arrive when the network-accessible services system is operating at the concurrent execution limit (of, e.g., 50 concurrent executions) cannot be rejected. The network-accessible services system or an auxiliary service, such as a message queue service, may place these messages in a queue to await processing.

In addition to the pre-initialization ("warming") of virtual machine instances, efforts to optimize the network-accessible services system's execution of user code may be focused on minimizing the amount of time it takes to execute the user code. This is especially true when there are limitations on the availability of resources, because a faster-executing user code will more quickly return its compute resources to the available pool. Often to process an event, a user code execution must first access a data store over a communication network and retrieve data corresponding to the event if the event itself does not include all the data needed for processing. For example, the event may be a creation of a new data file in the data store, and the user code may perform operations on the data file, but the event received by the network-accessible services system does not include the data file and the user code execution must retrieve it. For many reasons, retrieving the data file can add a significant amount of execution time for the user code. There are other common scenarios where optimization of this network communication step would have considerable performance gains in terms of function execution time.

The present disclosure provides further aspects of the system, in which elements manage the queuing and delivery of requests for program code execution that arrive when there are no program code instances available to allocate to the requests (i.e., the network-accessible services system is already operating the maximum number of program code and/or virtual machine instances allowed). A message queue service may place event messages awaiting processing into a queue. Using a set of handling rules, the message queue service may analyze a queued (or to-be-queued) event message to determine whether the user code will require any data that does not accompany the queued event message and must be retrieved. If so, the message queue service may retrieve the data and place the data in a cache storage. Where there are multiple network-accessible services systems that could potentially process the event message, the message queue service may identify the network-accessible services system that is most likely to process the event message, and may store the retrieved data in a cache storage that the identified network-accessible services system can access with a minimal amount of latency.

To implement this data "pre-fetch" feature, the owner of the user code may provide the handling rules, which may describe the user code's input/output model and various mappings between events, data sources, and options for cache storage. In some embodiments, the handling rules may set pre-fetching behaviors (e.g., whether or not to pre-fetch, cache storage location, etc.) based on certain parameters of the data to be retrieved, such as the size or type of a data file. The system can provide customizable integration with common data sources of a particular format, as well as with more generic data access methods such as HTTP requests. The handling rules may also specify certain preferences that can override automatic operations of the system, such as by setting a preferred caching destination for the pre-fetched data. When a user code instance becomes available to process an event message with pre-fetched data, the message queue service may deliver the selected event message together with addressing information for the pre-fetched data, or with the pre-fetched data itself, for processing.

Referring to FIG. 1, embodiments of the present disclosure may operate within or upon a computing environment 100 in which users (e.g., developers, website visitors, etc.) of user computing devices 102 may run various program codes using the virtual computing resources provided by a network-accessible services system 110 allocated within the computing environment 100. The computing environment 100 may be one of any suitable type and/or configuration of a compute resource virtualization platform implemented on one or more physical computing devices. Non-limiting examples of a computing environment 100 include data centers, clusters of data centers organized into zones or regions, a public or private cloud environment, and the like.

In general, the user computing devices 102 can be any computing device such as a desktop, laptop, mobile phone (or smartphone), tablet, kiosk, wireless device, and other electronic devices. In addition, the user computing devices 102 may include web services running on the same or different data centers, where, for example, different web services may programmatically communicate with each other to perform one or more techniques described herein. Further, the user computing devices 102 may include Internet of Things (IoT) devices such as Internet appliances and connected devices. The network-accessible services system 110 may provide the user computing devices 102 with one or more user interfaces, command-line interfaces (CLI), application programming interfaces (API), and/or other programmatic interfaces for generating and uploading user codes, invoking the user codes (e.g., submitting a request to execute the user codes on the network-accessible services system 110), scheduling event-based jobs or timed jobs, tracking the user codes, and/or viewing other logging or monitoring information related to their requests and/or user codes. Although one or more embodiments may be described herein as using a user interface, it should be appreciated that such embodiments may, additionally or alternatively, use any CLIs, APIs, or other programmatic interfaces.

The user computing devices 102 access the network-accessible services system 110 over a network 104. The network 104 may be any wired network, wireless network, or combination thereof. In addition, the network 104 may be a personal area network, local area network, wide area network, over-the-air broadcast network (e.g., for radio or television), cable network, satellite network, cellular telephone network, or combination thereof. For example, the network 104 may be a publicly accessible network of linked networks, possibly operated by various distinct parties, such as the Internet. In some embodiments, the network 104 may be a private or semi-private network, such as a corporate or university intranet. The network 104 may include one or more wireless networks, such as a Global System for Mobile Communications (GSM) network, a Code Division Multiple Access (CDMA) network, a Long Term Evolution (LTE) network, or any other type of wireless network. The network 104 can use protocols and components for communicating via the Internet or any of the other aforementioned types of networks. For example, the protocols used by the network 104 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

The network-accessible services system 110 is depicted in FIG. 1 as operating in a distributed computing environment including several computer systems that are interconnected using one or more computer networks. The network-accessible services system 110 could also operate within a computing environment having a fewer or greater number of devices than are illustrated in FIG. 1. Thus, the depiction of the network-accessible services system 110 in FIG. 1 should be taken as illustrative and not limiting to the present disclosure. For example, the network-accessible services system 110 or various constituents thereof could implement various Web services components, hosted or "cloud" computing environments, and/or peer-to-peer network configurations to implement at least a portion of the processes described herein. Additionally, the network-accessible services system 110 may be one of multiple separate network-accessible services systems 110, 112, 114 in the computing environment 100. The other network-accessible services systems 112, 114 may have the same or similar components as the network-accessible services system 110, described herein. In some embodiments, all or a subset of the network-accessible services systems 110-114 of the computing environment may be configured to execute the same user code 116. In one embodiment, the network-accessible services systems 110-114 may be redundant to each other, providing failover services and other protection from the loss of availability and/or operability of the system (i.e., incapacity of one of the network-accessible services systems 110-114 to execute user code and receive and process the event messages described herein).

Any of the network-accessible services systems 110-114 may be implemented in hardware and/or software and may, for instance, include one or more physical or virtual servers implemented on physical computer hardware configured to execute computer executable instructions for performing various features that will be described herein. The one or more servers may be geographically dispersed or geographically co-located, for instance, in one or more data centers. Thus, in some embodiments, the network-accessible services systems 110-114 may be physically located closer to some cache storages 160, 170 than others, and in some embodiments may have unique or shared implementations of a cache storage that is a component of the network-accessible services system 110-114 itself, as described further below. Similarly, the network-accessible services systems 110-114 may share a set of auxiliary services 106/event triggering services 106A, or may each have a separately implemented set of auxiliary services 106.

In the environment illustrated FIG. 1, the computing environment 100 includes a network-accessible services system 110, which includes a frontend 120, a warming pool manager 130, and a worker manager 140. In the depicted example, virtual machine instances ("instances") 152, 154 are shown in a warming pool 130A managed by the warming pool manager 130, and instances 156, 158 are shown in an active pool 140A managed by the worker manager 140. The illustration of the various components within the network-accessible services system 110 is logical in nature and one or more of the components can be implemented by a single computing device or multiple computing devices. For example, the instances 152, 154, 156, 158 can be implemented on one or more physical computing devices in different various geographic regions. Similarly, each of the frontend 120, the warming pool manager 130, and the worker manager 140 can be implemented across multiple physical computing devices. Alternatively, one or more of the frontend 120, the warming pool manager 130, and the worker manager 140 can be implemented on a single physical computing device. In some embodiments, the network-accessible services system 110 may comprise multiple frontends, multiple warming pool managers, and/or multiple worker managers. Although four virtual machine instances are shown in the example of FIG. 1, the embodiments described herein are not limited as such, and one skilled in the art will appreciate that the network-accessible services system 110 may comprise any number of virtual machine instances implemented using any number of physical computing devices. Similarly, although a single warming pool and a single active pool are shown in the example of FIG. 1, the embodiments described herein are not limited as such, and one skilled in the art will appreciate that the network-accessible services system 110 may comprise any number of warming pools and active pools.

In the example of FIG. 1, the network-accessible services system 110 is illustrated as being connected to the network 104. In some embodiments, any of the components within the network-accessible services system 110 can communicate with other components (e.g., the user computing devices 102 and auxiliary services 106, which may include monitoring/logging/billing services 107, a storage service 108, an instance provisioning service 109, a message queue service 105, and/or other services that may communicate with the network-accessible services system 110) of the computing environment 100 via the network 104. In other embodiments, not all components of the network-accessible services system 110 are capable of communicating with other components of the computing environment 100. In one example, only the frontend 120 may be connected to the network 104, and other components of the network-accessible services system 110 may communicate with other components of the computing environment 100 via the frontend 120. In some embodiments, any of the auxiliary services 106 may be configured to operate as an event triggering service 106A in order to listen for events specified by users of the auxiliary service and trigger generation of event messages for processing by the network-accessible services system 110, as described in more detail herein. Thus for example, the storage service 108 may be configured to operate as an event triggering service 106A in order to provide the capability of executing user code on the network-accessible services system 110 in response to events as they occur on the storage service 108.

In one embodiment, the one or more auxiliary services 106 may be registered or configured to be polled or queried for events to trigger execution of user codes on the network-accessible services system 110. Such registration or configuration may be provided or enabled via the one or more user interfaces provided to the user computing devices 102. For example, a user interface may provide options for the user to select or specify an auxiliary service 106 as an event-triggering service 106A, such that events on the event-triggering service 106A may trigger generation of event messages, or such that the event-triggering service 106A may be periodically polled or queried for events such as by an intermediary polling system.

In one embodiment, the event triggering service 106A may be configured to associate an event or event type with a particular program code to be executed on the network-accessible services system 110 (that is, the event triggering service 106A may store or have access to data which associates the event with the particular program code). In another embodiment, the event triggering service 106A may not necessarily associate an event or event type with a particular program code to be executed on the network-accessible services system 110, but rather (or in addition) the event triggering service 106A may generate event messages which the network-accessible services system 110 is configured to interpret as being associated with the program code to be executed on the network-accessible services system 110 (that is, the network-accessible services system 110 may store or have access to data which associates the event with the particular program code), In another embodiment, an intermediary system or service may be configured to handle interpretation and routing of event messages to execute the program code, such that neither the event triggering service 106A nor the network-accessible services system 110 may store or have access to the event-to-program code association data. For example, the event triggering service 106A may generate an event message that is agnostic to any particular program code to be executed; and the event message may be routed to the network-accessible services system 110 (or an intermediary system) which evaluates the event message and associated metadata to determine which program code to execute in response, and initiate a corresponding request to execute the program code.

As mentioned above, any of the auxiliary services 106 may be configured to operate as an event triggering service 106A. These include but are not limited to: remote storage systems; database systems; message queue systems (for example, a message queue service provided by the network-accessible services system 110, a message queue system owned and/or operated by a user or client separate from the network-accessible services system 110, and so on); web services; auditing services; health monitoring services (for example, for monitoring health status of a network-accessible services system); logging services; billing services; resource management systems and services (for example, for managing lifecycles and/or ownership of virtual computing environments and the like); and so on.

Users may use the network-accessible services system 110 to execute user code thereon. For example, a user may wish to run a piece of code in connection with a web or mobile application that the user has developed. One way of running the code would be to acquire virtual machine instances from service providers who provide infrastructure as a service, configure the virtual machine instances to suit the user's needs, and use the configured virtual machine instances to run the code. Alternatively, the user may send a code execution request the network-accessible services system 110. The network-accessible services system 110 can handle the acquisition and configuration of compute capacity (e.g., containers, instances, etc., which are described in greater detail below) based on the code execution request, and execute the code using the compute capacity. The network-accessible services system 110 may automatically scale up and down based on the volume by executing additional copies of the code, thereby relieving the user from the burden of having to worry about over-utilization (e.g., acquiring too little computing resources and suffering performance issues) or under-utilization (e.g., acquiring more computing resources than necessary to run the codes, and thus overpaying).

The frontend 120 receives and processes all the requests (sometimes in the form of event messages) to execute user code on the network-accessible services system 110. In one embodiment, the frontend 120 serves as a front door to all the other services provided by the network-accessible services system 110. The frontend 120 processes the requests generated, for example, in response to events and makes sure that the requests are properly authorized. For example, the frontend 120 may determine whether the user associated with the request is authorized to run the user code specified in the request.

The user code as used herein may refer to any program code (e.g., a program, routine, subroutine, thread, etc.) written in a specific program language. In the present disclosure, the terms "code," "user code," "function," and "program code," may be used interchangeably. Such user code may be executed to achieve a specific task, for example, in connection with an event generated by a particular web application or mobile application developed by the user. For example, the user codes may be written in JavaScript (node.js), Java, Python, and/or Ruby. The request may include an identifier of the event used to identify the function, the user code (or the location thereof), and one or more arguments to be used for executing the user code. For example, the user may provide the user code along with the request to execute the user code. In another example, the request may identify a previously uploaded program code (e.g., using the API for uploading the code) by its name or its unique ID. In yet another example, the code may be included in the request as well as uploaded in a separate location (e.g., the storage service 108 or a storage system internal to the network-accessible services system 110) prior to the request is received by the network-accessible services system 110. The network-accessible services system 110 may vary its code execution strategy based on where the code is available at the time the request is processed.

The frontend 120 may receive the request to execute such user codes in response to Hypertext Transfer Protocol Secure (HTTPS) requests from a user or in response to triggering events. Also, any information (e.g., headers and parameters) included in the HTTPS request may also be processed and utilized when executing the user code. As discussed above, any other protocols, including, for example, HTTP, MQTT, and CoAP, may be used to transfer the message containing the code execution request to the frontend 120. The frontend 120 may also receive the request to execute such user codes when an event is detected, such as an event that the user has registered to trigger automatic request generation. For example, the user may configured an auxiliary service 106 to operate as an event-triggering service 106A by registering the user code with the auxiliary service 106 and specifying that whenever a particular event occurs (e.g., a new file is uploaded), the request to execute the user code is sent to the frontend 120. Alternatively, the user may have registered a timed job (e.g., execute the user code every 24 hours). In such an example, when the scheduled time arrives for the timed job, the request to execute the user code may be sent to the frontend 120. A timed or scheduled job may be implemented using the techniques of this disclosure to, for example, model the job as an event generated by a timer service. For example, the timer service may generate an event message indicating that it is now time to run a user code, and the network-accessible services system 110 may implement a process to run code at a certain time by utilizing the timer service to remind the network-accessible services system 110 to run the user code. In yet another example, the frontend 120 may include or have access to a queue of incoming code execution requests, and when the user's batch job is removed from the network-accessible services system's work queue, the frontend 120 may process the user request. In yet another example, the request may originate from another component within the network-accessible services system 110 or other servers or services not illustrated in FIG. 1.

In yet another example, the request may originate from another component within the network-accessible services system 110 or other servers or services not illustrated in FIG. 1. In some embodiments, a request to execute/activate user codes may be generated in response to an event associated with the user computing device 102 or an auxiliary service 106. For example, in response to an end user uploading a new image from a user computing device to an auxiliary service (such as storage service 108) configured to operate as an event triggering service 106A, the event triggering service 106A can trigger a request to execute/activate a code to generate a thumbnail of the image. The code may be hosted in the active pool 120 or downloaded from a storage service storage service 108 to the network-accessible services system 110.

In any of the examples described above and throughout this disclosure, an event message representative of a request to execute the user code may be initially received by a message queue service 105 and then "queued" (i.e., provided to or placed in a message queue). In one embodiment, every event message may initially be queued, such that they do not trigger execution of the program code until they are retrieved, or requested by and delivered to, the frontend 120. Message events may be placed in the message queue for example by the message queue service 105, such as in response to when an event is detected for which the user has registered to trigger automatic generation of a request to execute user code. In some instances it may be desirable or more practical for the event triggering services 106A to detect such events, trigger generation of an event message, and provide the event message to the message queue service 105. In another embodiment, event messages may be initially received by the message queue service 105 only after delivery of the event message to the frontend 120 has been attempted and refused. For example, the event triggering services 106A may generate the event message and send it to the frontend 120, or may poll the frontend 120 to determine whether the frontend 120 can receive the event message; if the event triggering services 106A receive a reply containing the event message, or an error code, or a reply message indicating the frontend 120 cannot receive the event message, the event triggering services 106A may deliver the event message to the message queue service 105.

Alternatively, the event messages may all be initially received by the frontend 120, and the frontend 120 may determine whether an event message should be processed or sent to the message queue service 105. For example, the frontend 120 may query the event triggering service 106A directly to request and receive event messages for further processing, such as via invocation of an API provided by the event triggering service 106A. In another embodiment, the event triggering service 106A may interface directly with the frontend 120 via one or more APIs and function calls. For example, when an event is detected and an event message is generated, the event triggering system 106A may invoke an API provided by the frontend 120 to provide the event message directly to the frontend 120, without necessarily providing the event message to the message queue service 105. Upon receipt of the event message, the frontend 120 may, for example, poll the worker manager 140 to determine the status of network-accessible services system 110 resources; if the worker manager 140 replies that it cannot provide the resources necessary for executing an instance of the program code to process the event associated with the event message, the frontend 120 may send the event message to the message queue service 105 to be queued. The frontend 120 may send the entire event message to the message queue service 105, or may process the event message (e.g., in the event/request processing module 186) and send to the message queue service 105 only the event message data (e.g., elements of metadata contained in the event message) that the message queue service 105 needs to queue the event message in accordance with the presently described message queue framework and queuing methods.

The message queue service 105 may be implemented as a component of the auxiliary services 106, as illustrated in FIG. 1, or as a different component as described in exemplary embodiments below. The message queue service 105 may receive the entire event message, or a subset of data elements contained in the event message, or simply a reference pointer that identifies a location in physical memory of a data store where the event message is being stored, in various embodiments. Generally, the message queue service 105 may provide to or place in a queue the entire event message, or a subset of data elements contained in the event message (which may be the same or a different subset of data elements as the one received), or the associated reference pointer. More specifically, the message queue service 105 may include one or more queue data structures 105A each defining the structure and containing the queued messages of a logical representation of a queue 105A-1, 105A-2.

In various embodiments, each queue data structure 105A may be a stored record of a database (e.g., a relational database), a file, or another type of data structure stored in memory during a runtime of the message queue service 105. In one example, the queue data structure 105A representing a ready queue 105A-1 and/or a pre-fetch queue 105A-2, as described further below, may be a record containing a queue identifier that the message queue service 105 uses to access the queue 105A-1-2, and a one-dimensional array, a linked list, an ordered list, or another multiple-element data structure containing the event messages that have been placed in the queue 105A-1-2. In one embodiment, the array of the queue data structure 105A may have a preset number of elements, representing a maximum number of event messages that can be placed in the queue. Alternatively, there may be no specific limit on the number of elements in the array, and the size of the corresponding queue 105A-1-2 may be limited by other system limitations, such as a total amount of memory available to the message queue service 105. In embodiments where the queued event messages are represented in a linked list, the list element may include a reference to the element before and/or after it, as well as information identifying the queued event message the element represents. In various embodiments of representing event messages in the queue 105A-1-2, the array, linked list, and the like, may be configured to store reference pointers, event message identifiers, data structures containing event message data, and/or the event message itself.

Implemented on physical computing devices in the above manner, the message queue service 105 may queue event messages across a ready queue 105A-1, containing queued event messages 105B-1 that are ready for delivery to the frontend 120, and a pre-fetch queue 105A-2, containing queued event messages 105B-2 that are associated with data the user code needs in order to execute and process the associated event. Such queuing naturally includes accessing individual queues 105A-1-2 to add and remove event messages according to handling rules as described below. As stated above and described in more detail below, the message queue service 105 is configured to obtain information from the event message that identifies, or facilitates identification of, data associated with the event that triggered generation of the event message, the data potentially being eligible for retrieval from a data source (e.g., the storage service 108) and storage in a cache storage 160 in advance of the user code being executed to process the event. The information for determining there is eligible data, identifying the eligible data, and retrieving the eligible data, may be contained in the event message, or the message queue service 105 may determine that the event message information references external data that identifies the eligible data. The message queue service 105 may use this information to generate and send transmissions over the network 104 to external resources, which external resources may respond by providing the external data to the message queue service 105 (again via the network 104 and any other necessary networks, such as the internet).

Additionally or alternatively, the message queue service 105 may be configured to allow ordering of event messages, or distribution thereof across the active queues, or selection of queued event messages for delivery, so that certain event messages may receive a higher priority. In another example, the message queue service 105 may be specifically or specially configured to facilitate transportation of certain types of programmatic events, such as database operations, certain types of data suitable for batch processing, and so on. In one embodiment the message queue service 105 may be configured to provide streaming, and/or ordered transport of event messages (for example, as a shared set of data).

When there are queued event messages in the active queue(s), the frontend 120 may obtain the next event message from the message queue service 105. For example, the frontend 120 may poll the message queue service 105 and retrieve event messages for further processing by the network-accessible services system 110. The polling may, in some embodiments, occur according to a preset schedule, such as at particular times of day or at regular intervals. In other embodiments, the frontend 120 may poll the message queue service 105 when sufficient resources of the network-accessible services system 110 are available to execute a new instance (or re-execute an idle instance) of the program code; the frontend 120 may continuously poll the message queue service 105 for new event messages while the network-accessible services system 110 is not operating at capacity (i.e., the network-accessible services system 110 has resources available to process the event messages, and is not operating a maximum allowable number of concurrent program code executions). In accordance with the descriptions of message queue service 105 operations herein, the message queue service 105 may receive a request from the frontend 120 (or another component of the network-accessible services system 110) for the next queued event message to be processed, and the message queue service 105 may respond by selecting a queued event message 105B-1-2 from one of the queues 105A-1-2 and delivering the selected event message to the frontend 120.

A user request may specify one or more third-party libraries (including native libraries) to be used along with the user code. In one embodiment, the user request includes a package file (for example, a compressed file, a ZIP file, a RAR file, etc.) containing the user code and any libraries (and/or identifications of storage locations thereof). In some embodiments, the user request includes metadata that indicates the program code to be executed, the language in which the program code is written, the user associated with the request, and/or the computing resources (e.g., memory, etc.) to be reserved for executing the program code. For example, the program code may be provided with the request, previously uploaded by the user, provided by the network-accessible services system 110 (e.g., standard routines), and/or provided by third parties. In some embodiments, such resource-level constraints (e.g., how much memory is to be allocated for executing a particular user code) are specified for the particular user code, and may not vary over each execution of the user code. In such cases, the network-accessible services system 110 may have access to such resource-level constraints before each individual request is received, and the individual requests may not specify such resource-level constraints. In some embodiments, the user request may specify other constraints such as permission data that indicates what kind of permissions that the request has to execute the user code. Such permission data may be used by the network-accessible services system 110 to access private resources (e.g., on a private network).

In some embodiments, the user request may specify the behavior that should be adopted for handling the user request. In such embodiments, the user request may include an indicator for enabling one or more execution modes in which the user code associated with the user request is to be executed. For example, the request may include a flag or a header for indicating whether the user code should be executed in a debug mode in which the debugging and/or logging output that may be generated in connection with the execution of the user code is provided back to the user (e.g., via a console user interface). In such an example, the network-accessible services system 110 may inspect the request and look for the flag or the header, and if it is present, the network-accessible services system 110 may modify the behavior (e.g., logging facilities) of the container in which the user code is executed, and cause the output data to be provided back to the user. In some embodiments, the behavior/mode indicators are added to the request by the user interface provided to the user by the network-accessible services system 110. Other features such as source code profiling, remote debugging, etc. may also be enabled or disabled based on the indication provided in the request.

In some embodiments, the network-accessible services system 110 may include multiple frontends 120. In other embodiments, the multiple network-accessible services systems 110-114 in the computing environment 100 may each include its own frontend 120. In such embodiments, a load balancer may be provided to distribute the incoming requests and/or event messages to the multiple frontends 120, for example, in a round-robin fashion. The message queue service 105 may be configured to access or otherwise communicate with the load balancer in order to determine which frontend 120 or which network-accessible services system 110-114 is going to, or is likely to, receive a queued event message for processing. The message queue service 105 may use the identity of the "forecasted" network-accessible services system 110 to perform pre-fetching operations as described below. For example, forecasting that the network-accessible services system 110 is likely to receive a queued event message 105B-2 associated with data that is eligible for pre-fetching, the message queue service 105 may select, from a plurality of possible cache storages 160, 170, the cache storage 160 that the executing user code (e.g., code instance 156D-1) of the network-accessible services system 110 can access with the lowest data retrieval latency, and may store the pre-fetched data 162 in the cache storage 160.

The cache storage 160, 170 may be any suitable type of electronic data store that is readily available for access by the executing user code. In various embodiments, the cache storage 160, 170 may be one or more of: a distributed memory caching system that caches data and/or objects in random access memory or other high-speed memory; a collection of servers operating as cache nodes in a content delivery network; a static or scalable virtual file system; a database and/or a collection of files in a local file system of a physical computing device hosting some or all of the network-accessible services system 110; and the like. In some embodiments, the cache storage 160 may be implemented as a component of the network-accessible services system 110; in other embodiments, the cache storage 170 may be outside of the network-accessible services system 110 and may be accessible by an interface, database query, etc.

The warming pool manager 130 ensures that virtual machine instances are ready to be used by the worker manager 140 when the network-accessible services system 110 receives a request to execute user code on the network-accessible services system 110. In the example illustrated in FIG. 1, the warming pool manager 130 manages the warming pool 130A, which is a group (sometimes referred to as a pool) of pre-initialized and pre-configured virtual machine instances that may be used to service incoming user code execution requests. In some embodiments, the warming pool manager 130 causes virtual machine instances to be booted up on one or more physical computing machines within the network-accessible services system 110 and added to the warming pool 130A prior to receiving a code execution request that will be executed on the virtual machine instance. In other embodiments, the warming pool manager 130 communicates with an auxiliary virtual machine instance service (e.g., an instance provisioning service 109) to create and add new instances to the warming pool 130A. For example, the warming pool manager 130 may cause additional instances to be added to the warming pool 130A based on the available capacity in the warming pool 130A to service incoming requests. In some embodiments, the warming pool manager 130 may utilize both physical computing devices within the network-accessible services system 110 and one or more virtual machine instance services to acquire and maintain compute capacity that can be used to service code execution requests received by the frontend 120. In some embodiments, the network-accessible services system 110 may comprise one or more logical knobs or switches for controlling (e.g., increasing or decreasing) the available capacity in the warming pool 130A. For example, a system administrator may use such a knob or switch to increase the capacity available (e.g., the number of pre-booted instances) in the warming pool 130A during peak hours. In some embodiments, virtual machine instances in the warming pool 130A can be configured based on a predetermined set of configurations independent from a specific user request to execute a user's code. The predetermined set of configurations can correspond to various types of virtual machine instances to execute user codes. The warming pool manager 130 can optimize types and numbers of virtual machine instances in the warming pool 130A based on one or more metrics related to current or previous user code executions.

As shown in FIG. 1, instances may have operating systems (OS) and/or language runtimes loaded thereon. For example, the warming pool 130A managed by the warming pool manager 130 comprises instances 152, 154. The instance 152 includes an OS 152A and a runtime 152B. The instance 154 includes an OS 154A. In some embodiments, the instances in the warming pool 130A may also include containers (which may further contain copies of operating systems, runtimes, user codes, etc.), which are described in greater detail below. Although the instance 152 is shown in FIG. 1 to include a single runtime, in other embodiments, the instances depicted in FIG. 1 may include two or more runtimes, each of which may be used for running a different user code. In some embodiments, the warming pool manager 130 may maintain a list of instances in the warming pool 130A. The list of instances may further specify the configuration (e.g., OS, runtime, container, etc.) of the instances.

In some embodiments, the virtual machine instances in the warming pool 130A may be used to serve any user's request. In one embodiment, all the virtual machine instances in the warming pool 130A are configured in the same or substantially similar manner. In another embodiment, the virtual machine instances in the warming pool 130A may be configured differently to suit the needs of different users. For example, the virtual machine instances may have different operating systems, different language runtimes, and/or different libraries loaded thereon. In yet another embodiment, the virtual machine instances in the warming pool 130A may be configured in the same or substantially similar manner (e.g., with the same OS, language runtimes, and/or libraries), but some of those instances may have different container configurations. For example, two instances may have runtimes for both Python and Ruby, but one instance may have a container configured to run Python code, and the other instance may have a container configured to run Ruby code. In some embodiments, multiple warming pools 130A, each having identically-configured virtual machine instances, are provided.

The warming pool manager 130 may pre-configure the virtual machine instances in the warming pool 130A, such that each virtual machine instance is configured to satisfy at least one of the operating conditions that may be requested or specified by the user request to execute program code on the network-accessible services system 110. In one embodiment, the operating conditions may include program languages in which the potential user codes may be written. For example, such languages may include Java, JavaScript, Python, Ruby, and the like. In some embodiments, the set of languages that the user codes may be written in may be limited to a predetermined set (e.g., set of 4 languages, although in some embodiments sets of more or less than four languages are provided) in order to facilitate pre-initialization of the virtual machine instances that can satisfy requests to execute user codes. For example, when the user is configuring a request via a user interface provided by the network-accessible services system 110, the user interface may prompt the user to specify one of the predetermined operating conditions for executing the user code. In another example, the service-level agreement (SLA) for utilizing the services provided by the network-accessible services system 110 may specify a set of conditions (e.g., programming languages, computing resources, etc.) that user requests should satisfy, and the network-accessible services system 110 may assume that the requests satisfy the set of conditions in handling the requests. In another example, operating conditions specified in the request may include: the amount of compute power to be used for processing the request; the type of the request (e.g., HTTP vs. a triggered event); the timeout for the request (e.g., threshold time after which the request may be terminated); security policies (e.g., may control which instances in the warming pool 130A are usable by which user); etc.

The worker manager 140 manages the instances used for servicing incoming code execution requests. In the example illustrated in FIG. 1, the worker manager 140 manages the active pool 140A, which is a group (sometimes referred to as a pool) of virtual machine instances that are currently assigned to one or more users. Although the virtual machine instances are described here as being assigned to a particular user, in some embodiments, the instances may be assigned to a group of users, such that the instance is tied to the group of users and any member of the group can utilize resources on the instance. For example, the users in the same group may belong to the same security group (e.g., based on their security credentials) such that executing one member's code in a container on a particular instance after another member's code has been executed in another container on the same instance does not pose security risks. Similarly, the worker manager 140 may assign the instances and the containers according to one or more policies that dictate which requests can be executed in which containers and which instances can be assigned to which users. An example policy may specify that instances are assigned to collections of users who share the same account (e.g., account for accessing the services provided by the network-accessible services system 110). In some embodiments, the requests associated with the same user group may share the same containers (e.g., if the user codes associated therewith are identical). In some embodiments, a request does not differentiate between the different users of the group and simply indicates the group to which the users associated with the requests belong.

As shown in FIG. 1, instances may have operating systems (OS), language runtimes, and containers. The containers may have individual copies of the OS and the runtimes and user codes loaded thereon. In the example of FIG. 1, the active pool 140A managed by the worker manager 140 includes the instances 156, 158. The instance 156 has an OS 156A, runtimes 156B, 156C, and containers 156D, 156E. The container 156D includes a copy of the OS 156A, a copy of the runtime 156B, and a copy of a code 156D-1. The container 156E includes a copy of the OS 156A, a copy of the runtime 156C, and a copy of a code 156E-1. The instance 158 has an OS 158A, runtimes 158B, 158C, 158E, 158F, a container 158D, and codes 158G, 158H. The container 158D has a copy of the OS 158A, a copy of the runtime 158B, and a copy of a code 158D-1. As illustrated in FIG. 1, instances may have user codes loaded thereon, and containers within those instances may also have user codes loaded therein. In some embodiments, the worker manager 140 may maintain a list of instances in the active pool 140A. The list of instances may further specify the configuration (e.g., OS, runtime, container, etc.) of the instances. In some embodiments, the worker manager 140 may have access to a list of instances in the warming pool 130A (e.g., including the number and type of instances). In other embodiments, the worker manager 140 requests compute capacity from the warming pool manager 130 without having knowledge of the virtual machine instances in the warming pool 130A.

In the example illustrated in FIG. 1, user codes are executed in isolated compute systems referred to as containers (e.g., containers 156D, 156E, 158D). Containers are logical units created within a virtual machine instance using the resources available on that instance. For example, the worker manager 140 may, based on information specified in the request to execute user code, create a new container or locate an existing container in one of the instances in the active pool 140A and assigns the container to the request to handle the execution of the user code associated with the request. In one embodiment, such containers are implemented as Linux containers. The virtual machine instances in the active pool 140A may have one or more containers created thereon and have one or more program codes associated with the user loaded thereon (e.g., either in one of the containers or in a local cache of the instance). Each container may have credential information made available therein, so that user codes executing on the container have access to whatever the corresponding credential information allows them to access.

Once a request has been successfully processed by the frontend 120, the worker manager 140 finds capacity to service the request to execute user code on the network-accessible services system 110. For example, if there exists a particular virtual machine instance in the active pool 140A that has a container with the same user code loaded therein (e.g., code 156D-1 shown in the container 156D), the worker manager 140 may assign the container to the request and cause the user code to be executed in the container. Alternatively, if the user code is available in the local cache of one of the virtual machine instances (e.g., codes 158G, 158H, which are stored on the instance 158 but do not belong to any individual containers), the worker manager 140 may create a new container on such an instance, assign the container to the request, and cause the user code to be loaded and executed in the container.

If the worker manager 140 determines that the user code associated with the request is not found on any of the instances (e.g., either in a container or the local cache of an instance) in the active pool 140A, the worker manager 140 may determine whether any of the instances in the active pool 140A is currently assigned to the user associated with the request and has compute capacity to handle the current request. If there is such an instance, the worker manager 140 may create a new container on the instance and assign the container to the request. Alternatively, the worker manager 140 may further configure an existing container on the instance assigned to the user, and assign the container to the request. For example, the worker manager 140 may determine that the existing container may be used to execute the user code if a particular library demanded by the current user request is loaded thereon. In such a case, the worker manager 140 may load the particular library and the user code onto the container and use the container to execute the user code.

If the active pool 140A does not contain any instances currently assigned to the user, the worker manager 140 pulls a new virtual machine instance from the warming pool 130A, assigns the instance to the user associated with the request, creates a new container on the instance, assigns the container to the request, and causes the user code to be downloaded and executed on the container.

The user code may be downloaded from an auxiliary service 106 such as the storage service 108 of FIG. 1. Data 108A illustrated in FIG. 1 may comprise user codes uploaded by one or more users, metadata associated with such user codes, or any other data utilized by the network-accessible services system 110 to perform one or more techniques described herein. Although only the storage service 108 is illustrated in the example of FIG. 1, the computing environment 100 may include other levels of storage systems from which the user code may be downloaded. For example, each instance may have one or more storage systems either physically (e.g., a local storage resident on the physical computing system on which the instance is running) or logically (e.g., a network-attached storage system in network communication with the instance and provided within or outside of the network-accessible services system 110) associated with the instance on which the container is created. Alternatively, the code may be downloaded from a web-based data store provided by the storage service 108.

Once the worker manager 140 locates one of the virtual machine instances in the warming pool 130A that can be used to serve the user code execution request, the warming pool manager 130 or the worker manger 140 takes the instance out of the warming pool 130A and assigns it to the user associated with the request. The assigned virtual machine instance is taken out of the warming pool 130A and placed in the active pool 140A. In some embodiments, once the virtual machine instance has been assigned to a particular user, the same virtual machine instance cannot be used to service requests of any other user. This provides security benefits to users by preventing possible co-mingling of user resources. Alternatively, in some embodiments, multiple containers belonging to different users (or assigned to requests associated with different users) may co-exist on a single virtual machine instance. Such an approach may improve utilization of the available compute capacity.

In some embodiments, the network-accessible services system 110 may maintain a separate cache in which user codes are stored to serve as an intermediate level of caching system between a local cache of the virtual machine instances and a web-based or other network storage or remote computing device storage (e.g., an external cache storage 170 accessible via the network 104). In some embodiments, the cache storage 160 storing the pre-fetched data 162 may also store the user codes. In some embodiments, the cache storage 160 may be the local cache of the virtual machine instances. In any suitable implementation, the virtual machine instances 156, 158 of the active pool 140A may be configured to access the cache storage 160, such as under direction by a user code instance 156D-1 to retrieve the pre-fetched data 162 at the appropriate point in the user code execution.

After the user code has been executed, the worker manager 140 may tear down the container used to execute the user code to free up the resources it occupied to be used for other containers in the instance. Alternatively, the worker manager 140 may keep the container running to use it to service additional requests from the same user. For example, if another request associated with the same user code that has already been loaded in the container, the request can be assigned to the same container, thereby eliminating the delay associated with creating a new container and loading the user code in the container. In some embodiments, the worker manager 140 may tear down the instance in which the container used to execute the user code was created. Alternatively, the worker manager 140 may keep the instance running to use it to service additional requests from the same user. The determination of whether to keep the container and/or the instance running after the user code is done executing may be based on a threshold time, the type of the user, average request volume of the user, and/or other operating conditions. For example, after a threshold time has passed (e.g., 5 minutes, 30 minutes, 1 hour, 24 hours, 30 days, etc.) without any activity (e.g., running of the code), the container and/or the virtual machine instance is shutdown (e.g., deleted, terminated, etc.), and resources allocated thereto are released. In some embodiments, the threshold time passed before a container is torn down is shorter than the threshold time passed before an instance is torn down. In various embodiments, the pre-fetched data 162 may be deleted after it is used by the corresponding user code instance executing to process the associated event; the deletion may be immediately after the user code has finished executing, or together with the tearing down of the associated container, or at regular intervals. Additionally, the pre-fetched data 162 may be overwritten by new data if it becomes "stale" as indicated by the handling rules described below.

In some embodiments, the network-accessible services system 110 may provide data to one or more of the auxiliary services 106 as it services incoming code execution requests. For example, the network-accessible services system 110 may communicate with the monitoring/logging/billing services 107. The monitoring/logging/billing services 107 may include: a monitoring service for managing monitoring information received from the network-accessible services system 110, such as statuses of containers and instances on the network-accessible services system 110; a logging service for managing logging information received from the network-accessible services system 110, such as activities performed by containers and instances on the network-accessible services system 110; and a billing service for generating billing information associated with executing user code on the network-accessible services system 110 (e.g., based on the monitoring information and/or the logging information managed by the monitoring service and the logging service). In addition to the system-level activities that may be performed by the monitoring/logging/billing services 107 (e.g., on behalf of the network-accessible services system 110) as described above, the monitoring/logging/billing services 107 may provide application-level services on behalf of the user code executed on the network-accessible services system 110. For example, the monitoring/logging/billing services 107 may monitor and/or log various inputs, outputs, or other data and parameters on behalf of the user code being executed on the network-accessible services system 110. Although shown as a single block, the monitoring, logging, and billing services 107 may be provided as separate services. Any such data may be retrieved by the network-accessible services system 110 from the source of the data, or from the cache storage 160 if the data has been stored as pre-fetched data 162.

In some embodiments, the network-accessible services system 110 is adapted to begin execution of the user code shortly after it is received (e.g., by the frontend 120). A time period can be determined as the difference in time between initiating execution of the user code (e.g., in a container on a virtual machine instance associated with the user) and receiving a request to execute the user code (e.g., received by a frontend). Another time period can be determined as the difference in time between (1) detection of an event on an event-triggering service and (2a) receiving a request to execute the user code (e.g., received by a frontend) and/or (2b) initiating execution of the user code (e.g., in a container on a virtual machine instance associated with the user). Another time period can be determined as the difference in time between (1) retrieving, accessing, or receiving an event message (e.g., directly or indirectly from on an event-triggering service) and (2) initiating processing of a request to execute the user code (e.g., in a container on a virtual machine instance associated with the user). The network-accessible services system 110 is adapted to begin execution of the user code within a time period that is less than a predetermined duration. In one embodiment, the predetermined duration is 500 ms. In another embodiment, the predetermined duration is 300 ms. In another embodiment, the predetermined duration is 100 ms. In another embodiment, the predetermined duration is 50 ms. In another embodiment, the predetermined duration is 10 ms. In another embodiment, the predetermined duration may be any value chosen from the range of 10 ms to 500 ms. In some embodiments, the network-accessible services system 110 is adapted to begin execution of the user code within a time period that is less than a predetermined duration if one or more conditions are satisfied. For example, the one or more conditions may include any one of: (1) the user code is loaded on a container in the active pool 140A at the time the request is received; (2) the user code is stored in the code cache of an instance in the active pool 140A at the time the request is received; (3) the active pool 140A contains an instance assigned to the user associated with the request at the time the request is received; or (4) the warming pool 130A has capacity to handle the request at the time the request is received.

The worker manager 140 may include an instance allocation unit for finding compute capacity (e.g., containers) to service incoming code execution requests and a user code execution module for facilitating the execution of user codes on those containers. An example configuration of the frontend 120 is described in greater detail below with reference to FIG. 2.

Figure 2:
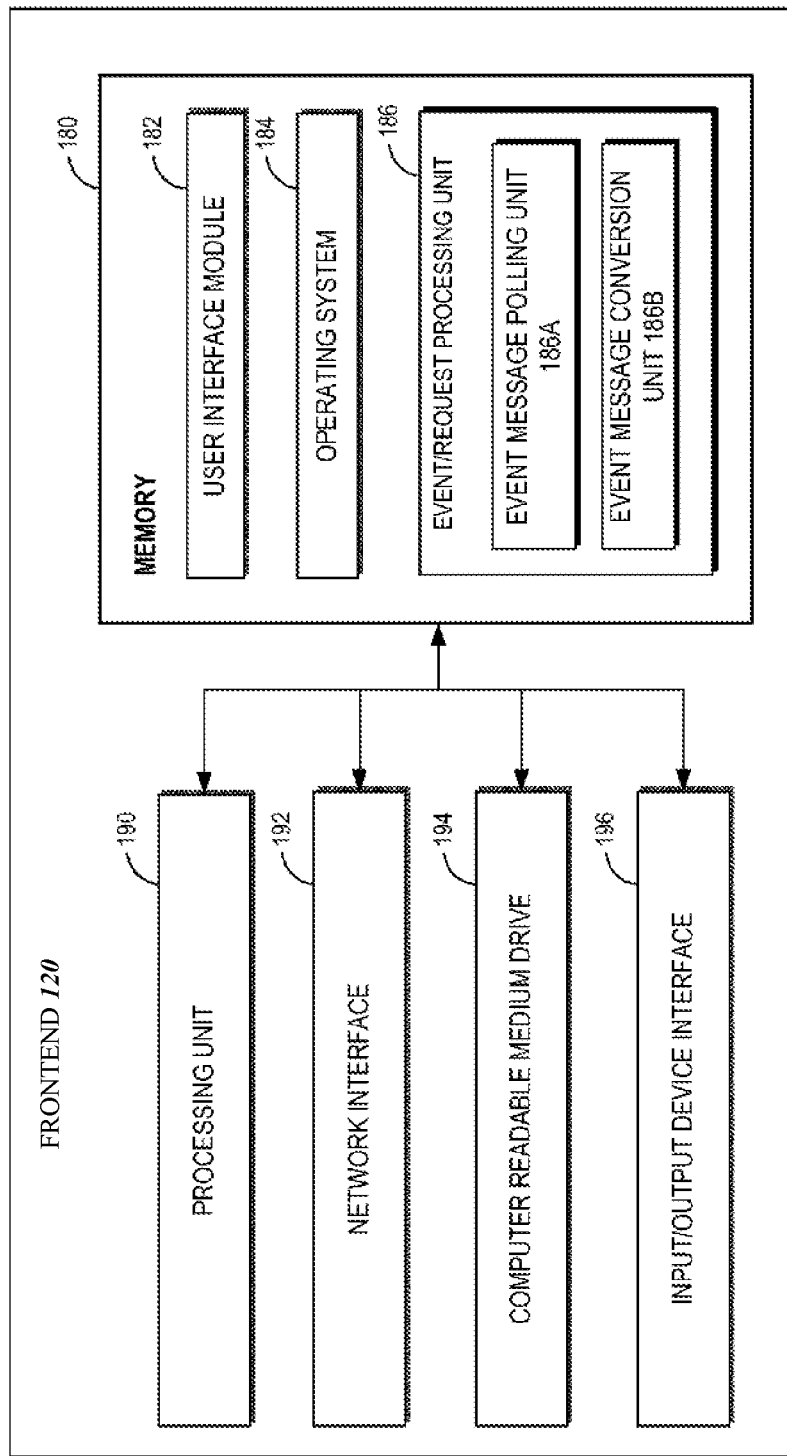
FIG. 2 is a block diagram of an exemplary computing device architecture providing a frontend for processing user requests to execute program codes.

FIG. 2 depicts a general architecture of a computing system (referenced as frontend 120) that processes event messages for user requests to execute program codes in the network-accessible services system 110. The general architecture of the frontend 120 depicted in FIG. 2 includes an arrangement of computer hardware and software modules that may be used to implement aspects of the present disclosure. The hardware modules may be implemented with physical electronic devices, as discussed in greater detail below. The frontend 120 may include many more (or fewer) elements than those shown in FIG. 2. It is not necessary, however, that all of these generally conventional elements be shown in order to provide an enabling disclosure. Additionally, the general architecture illustrated in FIG. 2 may be used to implement one or more of the other components illustrated in FIG. 1. As illustrated, the frontend 120 includes a processing unit 190, a network interface 192, a computer readable medium drive 194, an input/output device interface 196, all of which may communicate with one another by way of a communication bus. The network interface 192 may provide connectivity to one or more networks or computing systems. The processing unit 190 may thus receive information and instructions from other computing systems or services via the network 104. The processing unit 190 may also communicate to and from memory 180 and further provide output information for an optional display (not shown) via the input/output device interface 196. The input/output device interface 196 may also accept input from an optional input device (not shown).

The memory 180 may contain computer program instructions (grouped as modules in some embodiments) that the processing unit 190 executes in order to implement one or more aspects of the present disclosure. The memory 180 generally includes RAM, ROM and/or other persistent, auxiliary or non-transitory computer-readable media. The memory 180 may store an operating system 184 that provides computer program instructions for use by the processing unit 190 in the general administration and operation of the worker manager 140. The memory 180 may further include computer program instructions and other information for implementing aspects of the present disclosure. For example, in one embodiment, the memory 180 includes a user interface module 182 that generates user interfaces (and/or instructions therefor) for display upon a computing device, e.g., via a navigation and/or browsing interface such as a browser or application installed on the computing device. Such a user interface module 182 may provide to the owner of the user code a user interface that allows the user to enter the handling rules for pre-fetching data, as described below. In addition, the memory 180 may include and/or communicate with one or more data repositories (not shown), for example, to access user program codes and/or libraries.

In addition to and/or in combination with the user interface module 182, the memory 180 may include an event/request processing unit 188 which may include an event message polling unit 186A and an event message conversion unit 186B that may be executed by the processing unit 190. In one embodiment, the user interface module 182, the event message polling unit 186A, and the event message conversion unit 186B individually or collectively implement various aspects of the present disclosure, e.g., processing an event message for a request to executed user code, as described herein. In another embodiment, a separate polling service may be implemented, for example via a polling fleet configured to poll an event source or a message queue and perform at least an initial message conversion or processing to prepare the event message for further processing by the frontend 120 and/or another component of the network-accessible services system 100.

The event message polling unit 186A periodically polls for event messages to be processed into requests to execute user code. For example, the event message polling unit 186A may periodically access a message queue, such as the message queue service 105 or any other message queue service or message bus, to determine or detect whether an event message has been placed in the message queue for processing by the network-accessible services system 110. An event message may be placed in the message queue according to, for example, the routines described herein with reference to FIGS. 3A-5B. In response to determining or detecting an event message in the message queue, the event message polling unit 186A may retrieve the message event from the message queue and initiate further processing of the event message as further described herein. In another embodiment, the event message polling unit 186A may poll the event-triggering service 106A directly rather than from a message queue. For example, some event-triggering services such as certain types of databases may support direct polling of event messages that need not necessarily rely on an intermediary message queue.

The event message conversion unit 186B manages the conversion of the event message (e.g., as accessed or retrieved from a message queue such as the message queue 105) into a request to execute user code. In one embodiment the event message is generated in a format representative of a remote procedure call to facilitate rapid conversion and/or immediate function invocation by the network-accessible services system 110 when the event message is processed. Such an implementation enables a high degree of functional transparency and reduced latency between an auxiliary system responding to an event trigger and the network-accessible services system 110 processing the event message generated by the auxiliary system responsive to the event trigger. The event message conversion unit 186B may be configured to evaluate event messages received from the message queue service 105 to determine whether the message queue service 105 has pre-fetched any data associated with the event message. In some embodiments, the event message conversion unit 186B may retrieve the pre-cached data and deliver it to the virtual machine instance configured to execute the user code that needs the pre-cached data. In other embodiments, the event message conversion unit 186B may send an indicator signal to the virtual machine instance to notify the virtual machine instance that the pre-cached data is available in the cache storage 160.

While the event message polling unit 186A and the event message conversion unit 186B are shown in FIG. 2 as part of the frontend 120, in other embodiments, all or a portion of the event message polling unit 186A and the event message conversion unit 186B may be implemented by other components of the network-accessible services system 110 and/or another computing device. For example, in certain embodiments of the present disclosure, another computing device in communication with the network-accessible services system 110 may include several modules or components that operate similarly to the modules and components illustrated as part of the frontend 120. In some embodiments, the frontend 120 may further include components other than those illustrated in FIG. 2.

Figure 3A:
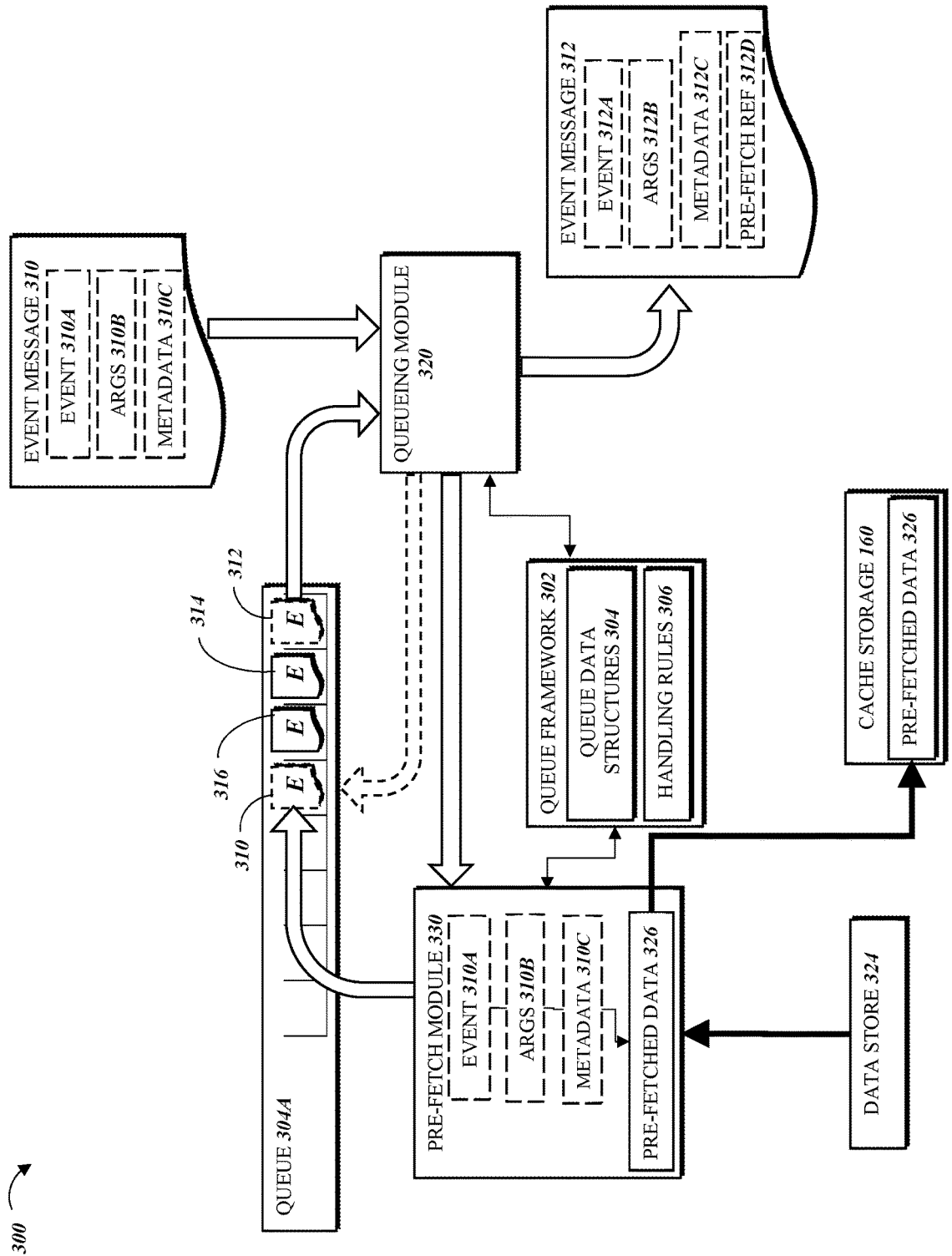
FIG. 3A is a diagram illustrating processing of event messages in a single queue by components of a message queue service in accordance with the present disclosure.

FIG. 3A is a logical diagram 300 of data inputs and processing performed by the message queuing system 105 of the above embodiments to queue, pre-fetch data for, and deliver event messages 310, 312, 314, 316. An event message 310-316 may include information that the system can use to determine whether there is data associated with the event message 310-316, retrieve the data, and store the data in a cache storage such as the cache storage 160 of FIG. 1. Such information may be content of an event message 310, and may include event data 310A identifying the event, one or more arguments 310B that specify how the associated request for execution of the program code is to be processed, and/or one or more elements of metadata 310C that further describe the event, the event source, the requestor, other resources to be accessed for processing the event, and the like. One or both of a queuing module 320 and a pre-fetch module 330 of the message queuing system may access a queue framework 302 comprising stored electronic information that implements the queuing mechanism. The queue framework 302 may include the queue data structures 304, which are the stored data elements that comprise a queue 304A, and one or more handling rules 306 that the queuing module 320 and/or the pre-fetch module 330 access to determine how to process an event message 310 and retrieve data (e.g., from a data store 324) and store it as pre-fetched data 326.

Figure 3C:
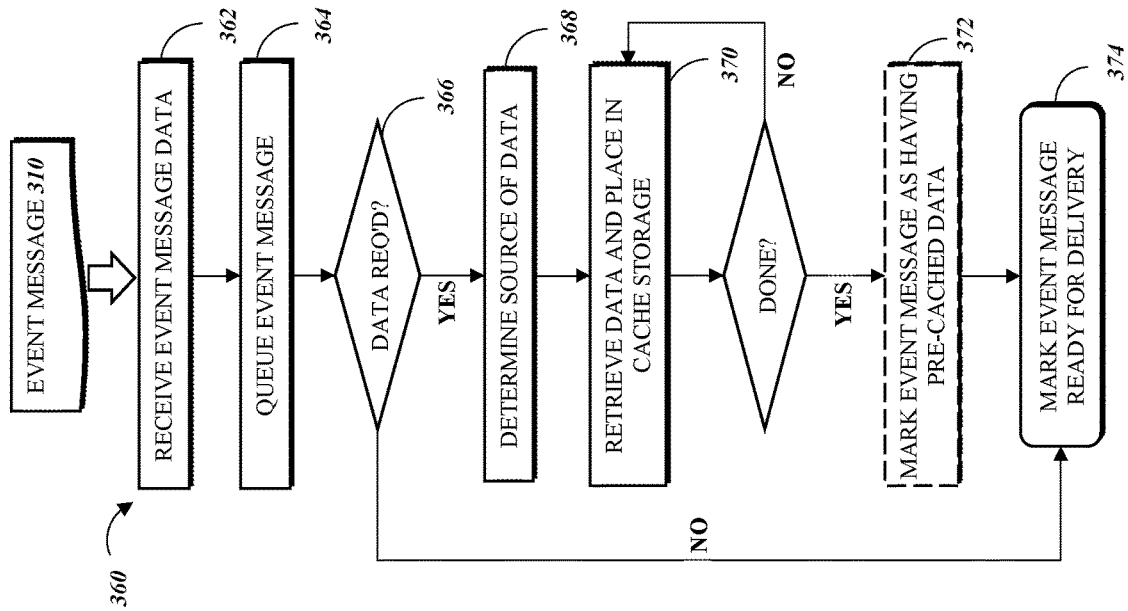
FIG. 3C is a flow diagram of another exemplary method for caching data related to event messages and queuing the event messages, in accordance with the present disclosure.
Figure 3B:
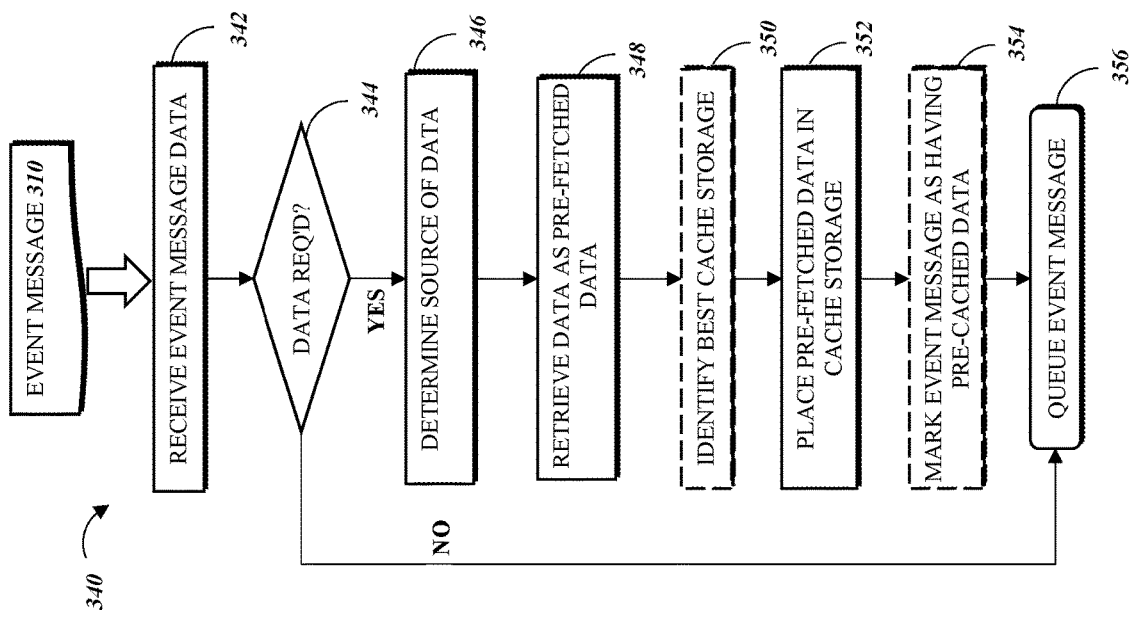
FIG. 3B is a flow diagram of an exemplary method for caching data related to event messages and queuing the event messages, in accordance with the present disclosure.

FIG. 3B illustrates a method 340 for queuing the event message 310 into a single queue and pre-fetching associated data as shown in FIG. 3A. Thus, with reference to FIGS. 3A-B, the event message 310 is received (step 342) and then processed (step 344) to determine whether the event message 310 indicates that there is data associated with the event that triggered the message, and whether that data is eligible to be retrieved and stored in advance of the user code executing to process the event. Either the queuing module 320 or the pre-fetch module 330 may perform step 344 and determine if there is data to retrieve; the determination may be made in accordance with the handling rules 306. The handling rules 306 may specify the data elements of the event message 310 that should be parsed or analyzed to identify data. In some embodiments, event data 310A such as the event type may indicate that the event has associated data that may be pre-fetched. For example, an event may be notification that a file was uploaded to a database, and the handling rules 306 may specify that the message queue service should identify and retrieve the file as pre-fetched data. In some embodiments, the arguments 310B to be passed to the user code, or the metadata 310C about the event message, or both, may include information about the associated data, such as a path to a file or event source. Additionally or alternatively, the handling rules 306 may specify information in the event message, such as authentication information or a URL, that may be used to communicate (e.g., over a network) with other electronic resources, such as a resource identified in the arguments 610B, to identify the data. The external resource may, for example, return information for identifying the requestor, such as a user account identifier.

Pre-fetching some associated data, though the data is necessary, may nonetheless provide little benefit or even cause unnecessary use of compute resources. The handling rules 306 may therefore specify one or more parameters for determining that identified data is also eligible for pre-fetching. For example, the handling rules 306 may configure the message queue service to only retrieve associated data if it meets certain criteria, such as by determining that the data is any or a combination of: a data file in one of a plurality of predetermined formats; metadata used in identifying resources for operations performed by the program code; over or under a predetermined threshold size; created or modified within a certain time period and/or by one of a plurality of identified users; a newer version of previously cached data; stored in, or intended to be moved or copied to, a particular data store 324 and/or network and/or geographic area or location; associated with a destination data store marked (e.g., by a flag or indicator) that it is eligible to be pre-fetched; and the like.

The handling rules 306 may further specify parameters that determine the appropriate cache storage for the eligible data. For example, in accordance with the handling rules 306, pre-fetched data files within a first size range may be sent to a first cache storage that is an in-memory virtual cache in a particular network-accessible services system, and pre-fetched data files that are too big to be efficiently stored in the first cache storage may be sent to a local file system of a server that implements the network-accessible services system. The handling rules 306 may further include other specifications such as an amount of time to keep pre-fetched data 326 in a cache storage 160 (i.e., to prevent use of stale data), a number of times the pre-fetched data 326 may be reused by other program code instances that require it, and a list of user codes, requestors, other devices, etc., which have permission to access the pre-fetched data 326.

The handling rules 306 may be provided by a user, such as by the owner of the program code accessing a user interface as described above to enter the handling rules 306 that will be used to identify, retrieve, and store pre-fetch-eligible data. Additionally or alternatively, the handling rules 306 may be derived via one or more learning algorithms that identify trends in associated data and evaluate, by experimental or simulated pre-fetching whether pre-fetching certain data and storing it in certain cache storage improves the performance of the user code. In one example, the system may automatically develop handling rules 306 for forecasting which of a plurality of network-accessible services systems will be processing the event message 310 (i.e., when the event message 310 is at the front of the queue 304A and the network-accessible services system requests a queued event message for processing). For example, the handling rules 306 may direct the system to determine the destination of an output of the executed user code, and may attempt to store the pre-fetched data 326 in the most favorable cache storage for the network-accessible services system that is closest to the output's destination. The forecasting rules may be overridden by other handling rules 306 in which the owner has specified a cache storage for the pre-fetched data.

If there is associated data eligible for pre-fetching, the message queue service may begin to retrieve it. In some embodiments, the queuing module 320 determines whether there is eligible data and then sends the event message 310 to the pre-fetch module 330 to retrieve and store the data. The queuing module 320 may also queue the event message 310, or the pre-fetch module 330 may do so. In the example method 340 of FIG. 3B, the event message 310 is queued (step 356) if there is no eligible data to pre-fetch, but if there is data, the event message 310 is not immediately placed in the queue 304A. First, the pre-fetch module 330 identifies the data source 324 that contains the eligible data (step 346). Then, the pre-fetch module 330 retrieves the eligible data as pre-fetched data 326 (step 348). If there are multiple candidate network-accessible services systems or candidate cache storages, the pre-fetch module 330 may identify the best cache storage to contain the pre-fetched data 326 (step 350). The pre-fetch module 330 may then send the pre-fetched data 326 to the selected cache storage 160 (step 352).

Optionally, before queuing the event message 310 the pre-fetch module 330 may mark the event message 310 as having pre-fetched data associated with it (step 354). For example, the pre-fetch module 330 may add a pre-fetch reference 310D to the event message 310; the reference 310D may be a flag in some embodiments, while in others the reference 310D may be a path or pointer to the location of the pre-fetched data 326 in the cache storage 160, to be used by the frontend 120 or executing user code to locate and retrieve the pre-fetched data 326. The pre-fetch module 330 may then queue the event message 310 or may send the event message 310 back to the queuing module 320 for queuing in the next available slot (i.e., behind the last event message 316, which in this embodiment may have arrived after the event message 310 but did not have any data to pre-fetch or completed its pre-fetching earlier).

FIG. 3C illustrates another method 360 of pre-fetching data and queuing the event message 310 using the system of FIG. 3A. After receiving the event message (step 362), the queuing module 320 may immediately place the event message 310 in the queue 304A (step 364). Thus, the event message 310 is in the queue 304A even though the pre-fetching of the data is not complete. The queuing module 320 or the pre-fetch module 330 may then determine whether there is eligible data for retrieval (step 366). If not, the queuing module 320 or the pre-fetch module 330 may mark the queued event message 310 as ready for delivery (step 374). By setting such an indicator or flag, the queuing module 320 will retrieve the event message 310 for delivery when the event message 310 reaches the front of the queue 304A. In contrast, if the indicator or flag is not set, it means the pre-fetch module 330 is still pre-fetching data and the event message 310 is not ready for processing.

If the event message 310 is associated with data that can be pre-fetched, the pre-fetch module 330 may identify the data store 324 (step 368) and retrieve and store the eligible data as pre-fetched data 326 (step 370) as described above. Once the pre-fetched data 326 has been sent to the cache storage 160, the pre-fetch module 330 may mark the queued event message 310 as being associated with the pre-fetched data 326 (step 372) and then may mark the event message 310 as ready for delivery (step 374).

FIG. 3D illustrates an exemplary method 380 for delivering a queued event message for processing. Thus, with reference to FIGS. 3A and 3D, to deliver a queued event message, such as upon receipt (step 382) of a request from the frontend for the next event message, the queuing module 320 may select the next queued event message 312 in the queue 304A (i.e., the event message 312 at the front of the queue 304A). In one embodiment, the queuing module 320 may determine whether the selected event message 312 is marked as ready for delivery (step 385). If not, the queuing module 320 may select the next queued event message 314 in the queue 304A for delivery (step 384, repeated), essentially skipping the event message(s) that are waiting for pre-fetched data 326 to be stored. Once the selected event message 312 is ready for processing, the queuing module 320 may retrieve the event message 312 (step 386) and deliver it to the frontend (step 388) for processing. As shown in FIG. 3E, once the event message 312 is delivered, a method 390 of preparing the program code for execution may be performed by the frontend and/or by an instance of the program code. At step 392 the event message, or data (e.g. event data 312A, arguments 213B, metadata 312C, and/or the pre-fetch reference 312D) of the processed and converted event message, is received. Then, the data needed to execute the program code is identified (step 394) from the received event message 312 data.

In some embodiments, such as when the owner has created a handling rule 306 stating that all event messages have eligible data to be pre-fetched to a particular cache storage, the system may presume there is pre-fetched data 326, and may not perform the query of step 395. In other embodiments, the system may determine whether the identified data has been pre-fetched (step 395), such as by reading the pre-fetch reference 312D of the event message 312. If there is pre-fetched data 326, the system may retrieve the pre-fetched data 326 from the cache storage 160 (step 396). If the data needed by the program code has not been pre-fetched, the system may retrieve the data from its data store (397). Then, the program code may begin or continue executing (step 398) using the required data.

Figure 4A:
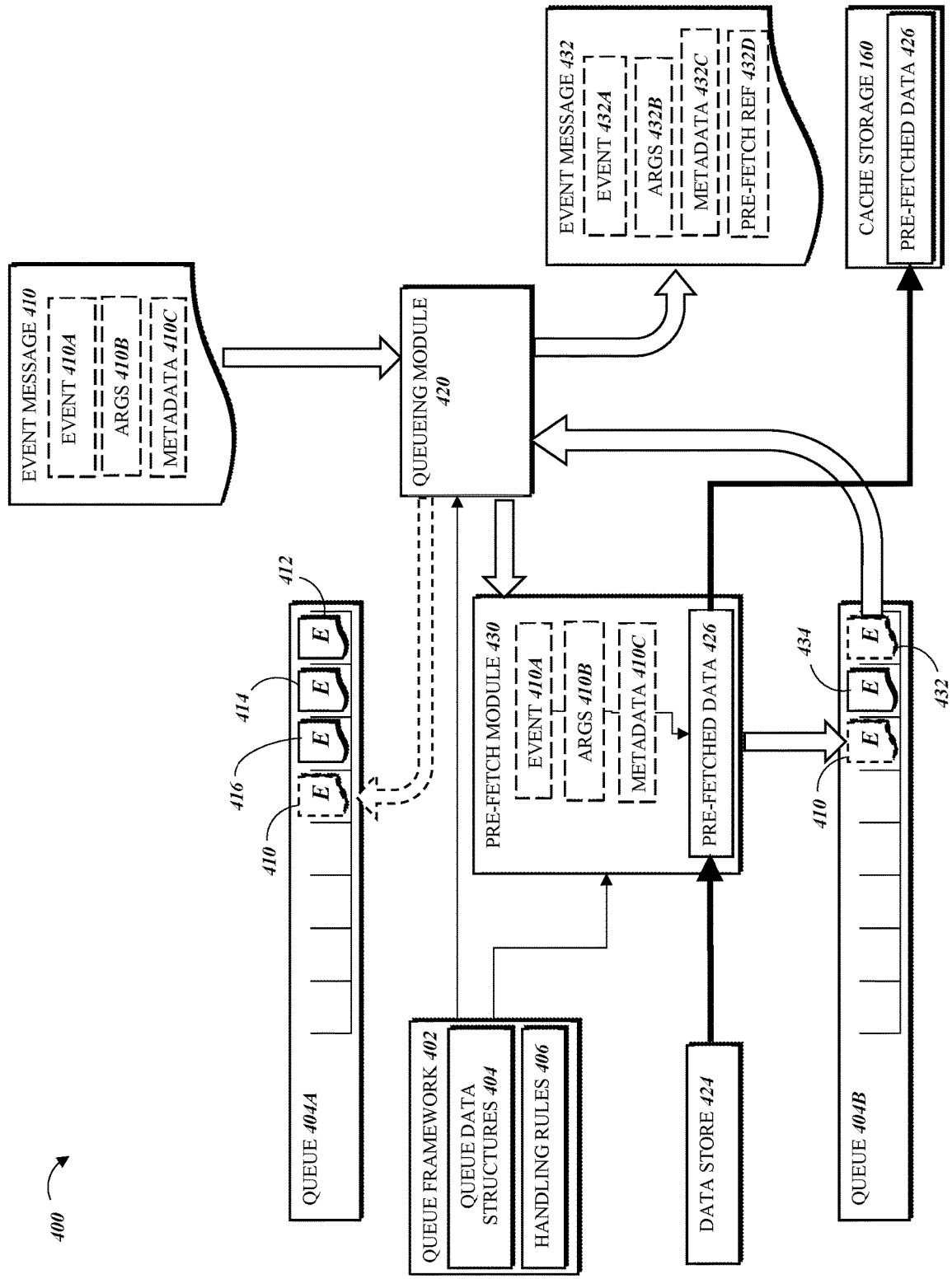
FIG. 4A is a diagram illustrating processing of event messages in multiple queues by components of a message queue service in accordance with the present disclosure.
Figures 4B, 4C:
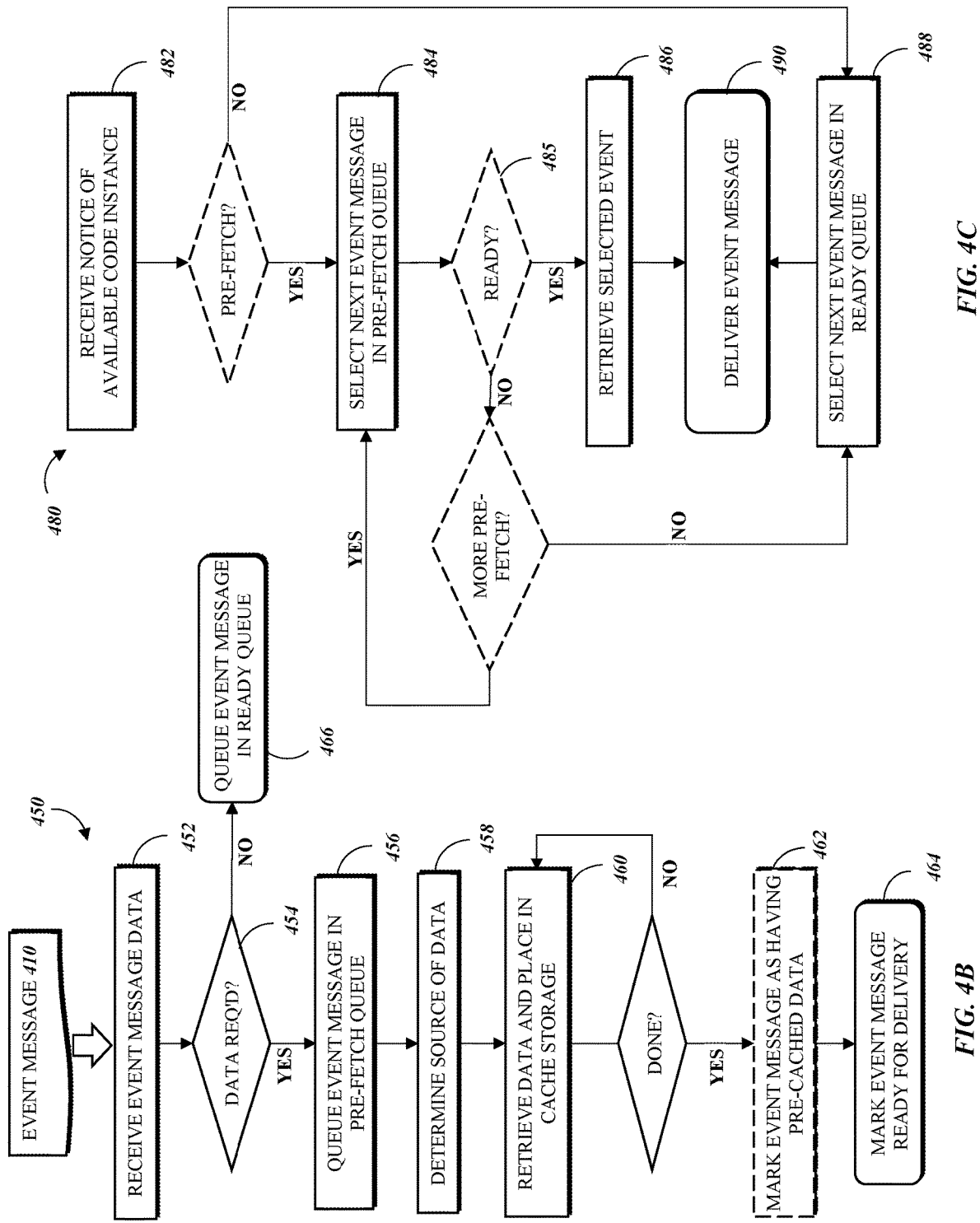
FIG. 4B is a flow diagram of another exemplary method for caching data related to event messages and queuing the event messages, in accordance with the present disclosure.
FIG. 4C is a flow diagram of another exemplary method for delivering queued event messages, in accordance with the present disclosure.

FIG. 4A is a logical diagram 400 of data inputs and processing performed by the message queuing system 105 of the above embodiments to queue, pre-fetch data for, and deliver event messages 410, 412, 414, 416, 432, 434 using queue data structures 404 that define a ready queue 404A for event messages 412-416 that do not benefit from pre-fetching, and a pre-fetch queue 404B for event messages 432, 434 that do. FIG. 4B illustrates an exemplary method 450 for pre-fetching data and queuing the associated event message in the system of FIG. 4A. An event message 410 having data 410A-C as described above is received (step 452) by a queuing module 420. The queuing module 420 (or the pre-fetch module 430) may determine if there is data eligible for pre-fetching in association with the trigger event (step 454), using handling rules 406 of a queue framework 402 as described above. If not, the queuing module 420 may immediately queue the event message 410 in the next available slot of the ready queue 404A (i.e., behind the last queued event message 416) (step 466).

If there is eligible data, the queuing module 420 or the pre-fetch module 430 may place the event message 410 in the pre-fetch queue 404B (step 456). The pre-fetch module 430 may then identify the data store 424 containing the eligible data (step 458) and retrieve the eligible data and place the eligible data in a selected caching store 160 (step 460) as described above. Once the eligible data is stored as pre-fetched data 426, the pre-fetch module 430 may optionally mark the queued event message 410 as having pre-fetched data (e.g., by adding a pre-fetch reference 432D to the event message data) (step 462) and mark the event message 410 ready for delivery (step 464) as described above. Thus, in some embodiments, the ready queue 404A contains messages that are ready for delivery, and the pre-fetch queue 404B contains messages that are either ready for delivery (i.e., the pre-fetched data 426 has been successfully stored) or are still waiting for the pre-fetch module 430 to finish retrieving and storing the eligible data as pre-fetched data 426. Alternatively, the pre-fetch module 330 may not place the event message 410 into the pre-fetch queue 404B until the associated data has been completely pre-fetched, in which case both queues 404A-B contain only ready event messages and an indicator of readiness is not needed.

FIG. 4C illustrates an exemplary method 480 for delivering queued event messages from the queues 404A-B of FIG. 4A, in which event messages 432, 434 that have pre-fetched data are presumed to have been waiting longer than event messages 412-416 in the ready queue 404A due to the time spent pre-fetching the data; thus, servicing the pre-fetch queue 404B is prioritized. The queuing module 420 receives a request for a queued event message (step 482) and first determines whether there are any queued event messages in the pre-fetch queue 404B. If not, the queuing module 420 retrieves the first queued event message 412 from the ready queue 404A (step 488) and delivers the selected event message 412 to the frontend (step 490).

If there are queued event messages in the pre-fetch queue 404B, the queuing module 420 may select the first queued event message 432. Optionally, the queuing module 420 may determine whether the selected event message 432 is ready for delivery (e.g., the requisite flag is set) (step 485), and if so retrieves the selected event message 432 (step 486) and delivers the selected event message 432 to the frontend (step 490). If the selected event message 432 is not ready for delivery, and there are no more queued event messages in the pre-fetch queue 404B, the queuing module 420 may instead retrieve (step 488) and deliver (step 490) the first event message 412 in the ready queue 404A. If there is another queued event message 434 in the pre-fetch queue 404B, the queuing module 420 may select it (step 484, repeated). In another embodiment, the pre-fetch module 430 may not place event messages in the pre-fetch queue 404B until the pre-fetching of data is completed. In yet another embodiment, the queuing module 420 or the pre-fetch module 430 may move queued event messages that are ready for delivery forward in the pre-fetch queue 404B, obviating the need to return to step 484 and select a queued event message that is not at the front of the pre-fetch queue 404B.

Figure 5A:
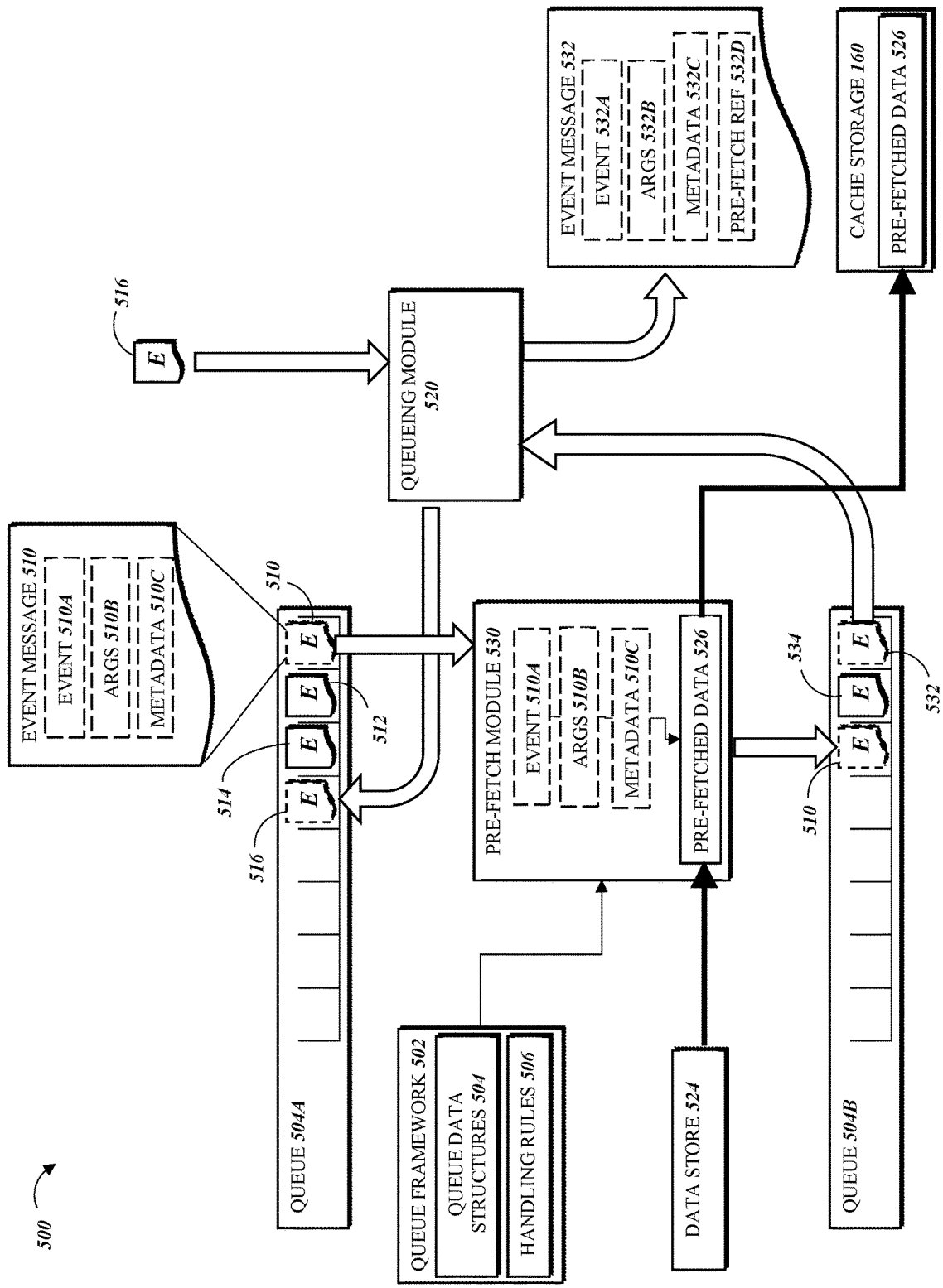
FIG. 5A is a diagram illustrating another embodiment of processing event messages in multiple queues by components of a message queue service in accordance with the present disclosure.

FIG. 5A is a logical diagram 500 of data inputs and processing performed by the message queuing system 105 of the above embodiments to queue, pre-fetch data for, and deliver event messages 510, 512, 514, 516, 532, 534 using queue data structures 504 that define a ready queue 504A for event messages 512-516 that do not benefit from pre-fetching, and a pre-fetch queue 504B for event messages 532, 534 that do. In the system of FIG. 5A, a queuing module 520 and a pre-fetch module 530 may operate in logical isolation from each other. The queuing module 520 receives each event message 510-516 and queues it in the ready queue 504A, as described above, whether or not the event message is associated with data that is eligible for pre-fetching under handling rules 506 of a queue framework 502 as described above. Independently, the pre-fetch module 530 may, when available, remove a queued event message from the ready queue 504A into the pre-fetch queue 504B if the event message has data eligible for pre-fetching. The pre-fetch module 530 may then pre-fetch the data, and the queuing module 520 may retrieve and deliver queued event messages (e.g., by prioritizing the pre-fetch queue 504B), as described above.

Figure 5B:
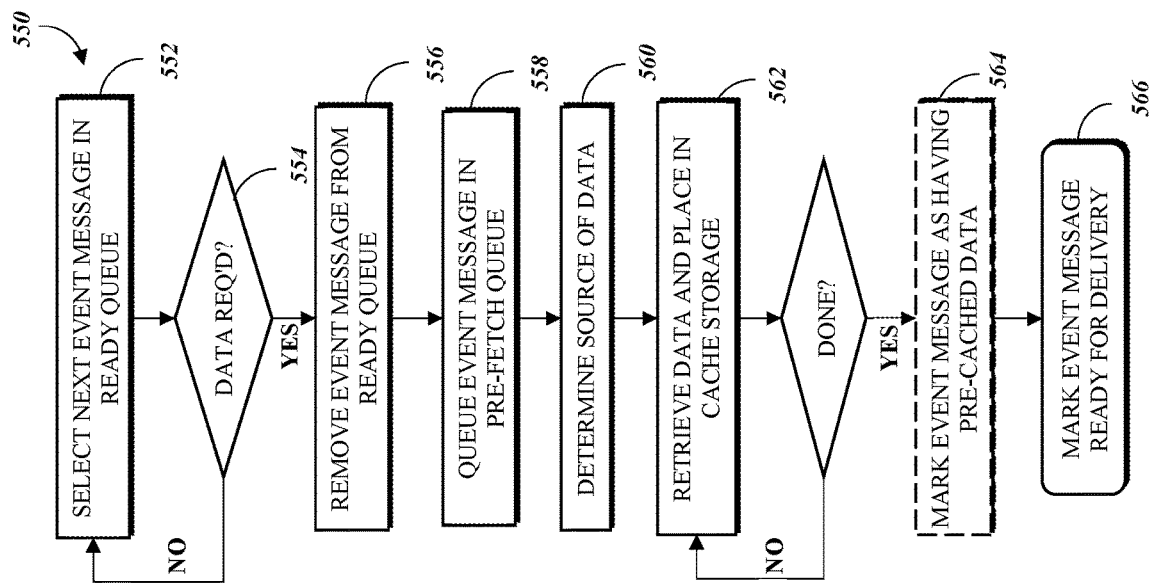
FIG. 5B is a flow diagram of another exemplary method for caching data related to event messages and queuing the event messages, in accordance with the present disclosure.

FIG. 5B illustrates an exemplary method 550 for pre-fetching data and queuing the associated event message in the system of FIG. 5A. The next queued event message 510 (having data 510A-C as described above) is selected (step 552) and evaluated to determine if there is data eligible for pre-fetching in association with the trigger event (step 554). If not, the next queued event message 512 is selected (step 552, repeated) iteratively until an event message with eligible data is selected. The, the selected event message is removed from the ready queue 504A (step 556) and placed in the next open slot (i.e., behind queued event message 534) in the pre-fetch queue 504B (step 558). Then, the data source 524 of the eligible data is identified (step 560) and the eligible data is retrieved and stored as pre-fetched data 526

(step 562) in accordance with the above-described methods. Once this is complete, the queued event message may be marked as having pre-fetched data (e.g., by adding a pre-fetch reference 532D to the event message) (step 564) and as being ready for delivery (step 566). The queuing module 520 may retrieve a ready event message 532 and deliver it to the frontend upon receipt of a request as described above.

Figure 6A:
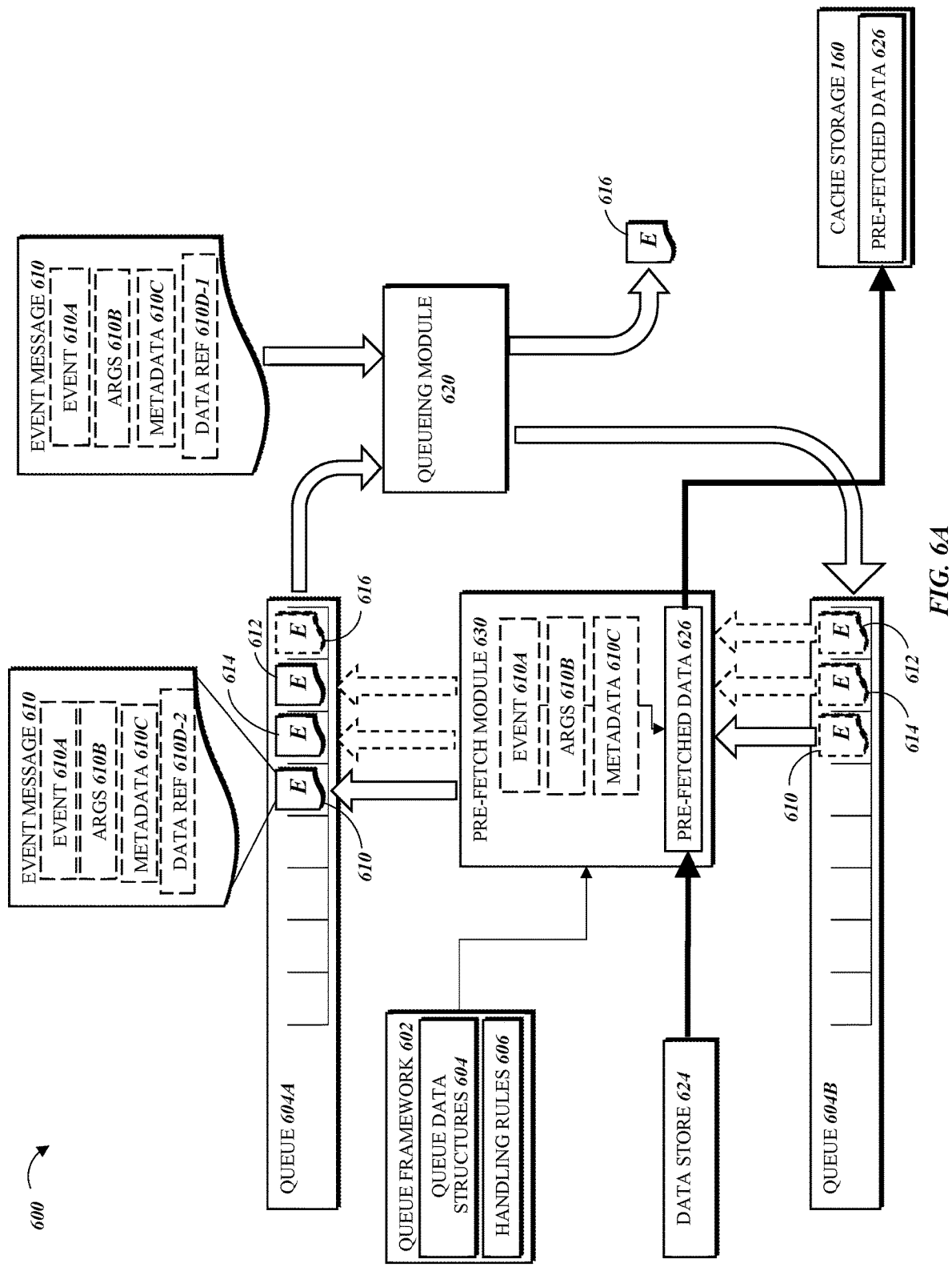
FIG. 6A is a diagram illustrating another system for processing of event messages in multiple queues by components of a message queue service in accordance with the present disclosure.

FIG. 6A is a logical diagram 600 of data inputs and processing performed by the message queuing system 105 of the above embodiments to queue, pre-fetch data for, and deliver event messages 610, 612, 614, 616 using queue data structures 604 that define a ready queue 604A for event messages 610-616 that either do not benefit from pre-fetching or have had data pre-fetched as described herein, and a pre-fetch queue 604B for intake of event messages 610-616. Each event message (e.g., event message 610) may contain or reference data 610A-C as described above. Additionally, or as an element of the data 610A-C (e.g., as an argument 610B passed into the network-accessible services system for processing the associated event, or as metadata 601C describing the event) the event message 610 may contain a data reference 610D-1 that identifies data that must be retrieved in order to process the event message 610. For example, the data reference 610D-1 may be a path or address to a data object that must be retrieved from a data store 624. In the system of FIG. 6A, a queuing module 620 and a pre-fetch module 630 may operate in logical isolation from each other. The queuing module 620 receives each event message 610-616 and queues it in the pre-fetch queue 604B, as described above, whether or not the event message 610-616 is associated with data that is eligible for pre-fetching under handling rules 606 of a queue framework 602 as described above. Independently, the pre-fetch module 630 may, when available, remove a queued event message 610-614 from the pre-fetch queue 604B, determine if the event message 610-614 has data eligible for pre-fetching, pre-fetch the data, and then place the event message 610-614 in the ready queue 604A when the event message 610-614 is ready for delivery. The queuing module 620 may retrieve and deliver queued event messages in the ready queue 604A as described above.

Figure 6C:
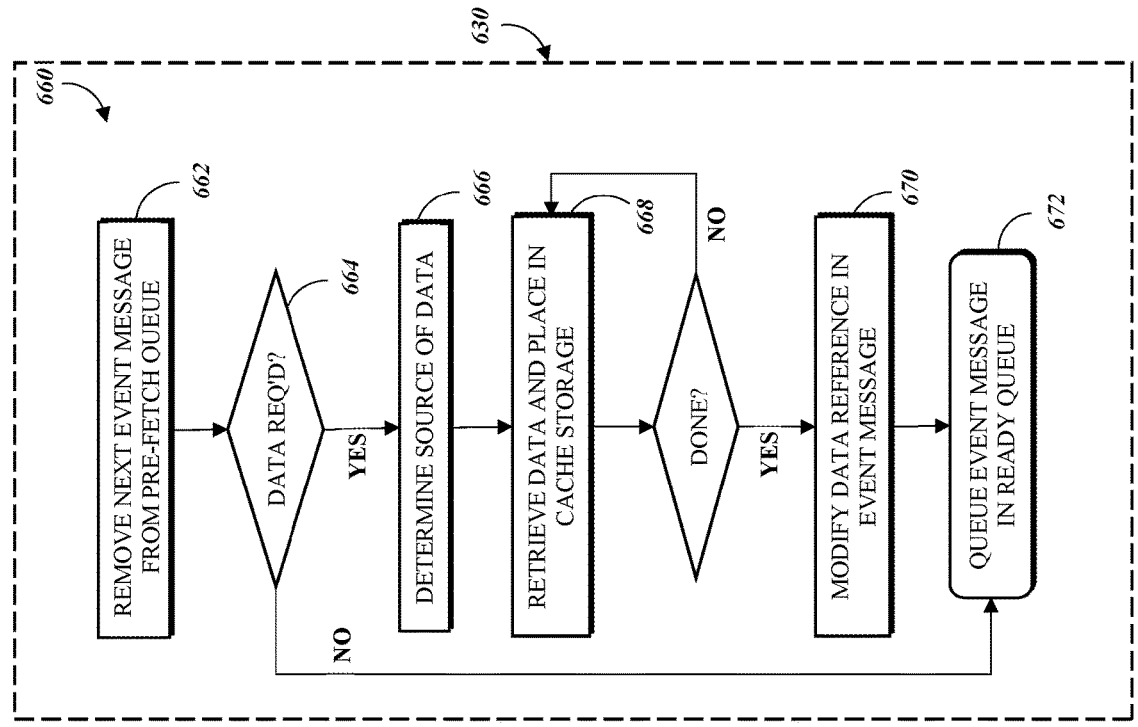
FIG. 6C is a flow diagram of another exemplary method for pre-fetching data associated with event messages, in accordance with the present disclosure.
Figure 6B:
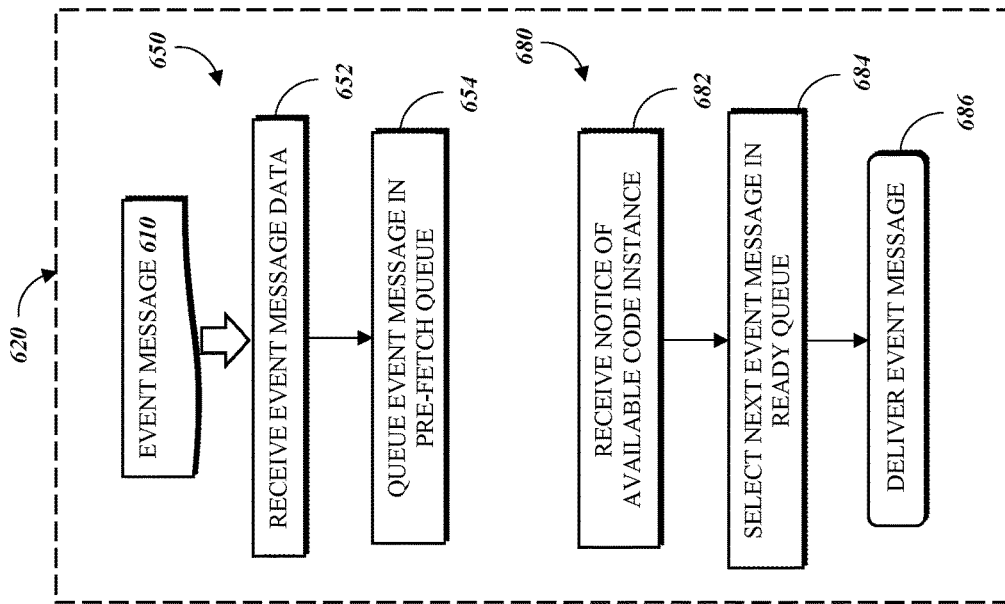
FIG. 6B is a flow diagram of another exemplary method for queuing and delivering event messages in accordance with the present disclosure.

FIGS. 6B and 6C illustrates exemplary methods 650, 660, 680 of operation in the queuing module 620 and pre-fetch module 630 to pre-fetch data and queue the associated event message in the system of FIG. 6A. In a method 650 of intaking a new event message 610, the event message data is received (step 652) and then the event message 610 is queued in the pre-fetch queue 604B (step 654) as described above. Then (or meanwhile), in a method 660 of servicing the pre-fetch queue 604B, event messages 610-614 in the pre-fetch queue 604B are sequentially selected and removed from the pre-fetch queue 604B (step 662). The selected event message is evaluated to determine if there is data eligible for pre-fetching in association with the trigger event (step 664). If not (e.g., there is no data reference 610D-1, or the data object referenced by the data reference 610D-1 is not eligible for pre-fetching under the handling rules 606), the selected event message is placed in the next open slot of the ready queue 604A (step 672).

If there is eligible data to be pre-fetched, the data source 624 of the eligible data is identified (step 666) and the eligible data is retrieved and stored as pre-fetched data 626 (step 668) in accordance with the above-described methods. Once this is complete, the data reference 610D-1 may be replaced or modified (step 670) to produce a new data reference 610D-2 that identifies the pre-fetch data 626 stored in the cache storage 160. The event message with the modified data reference 610D-2 may then be placed in the next open slot of the ready queue 604A (step 672). Then (or meanwhile), in a method 680 of delivering the queued event messages, upon receipt (step 682) of a request for a queued event message, the queuing module 620 may retrieve the first queued event message 616 in the ready queue 604A (step 684) and deliver it to the frontend (step 686) as described above.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

One skilled in the art will realize that a virtually unlimited number of variations to the above descriptions are possible, and that the examples and the accompanying figures are merely to illustrate one or more examples of implementations.

It will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular embodiments disclosed, but that such claimed subject matter may also include all embodiments falling within the scope of the appended claims, and equivalents thereof.

In the detailed description above, numerous specific details are set forth to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter.

Reference throughout this specification to "one embodiment" or "an embodiment" may mean that a particular feature, structure, or characteristic described in connection with a particular embodiment may be included in at least one embodiment of claimed subject matter. Thus, appearances of the phrase "in one embodiment" or "an embodiment" in various places throughout this specification is not necessarily intended to refer to the same embodiment or to any one particular embodiment described. Furthermore, it is to be understood that particular features, structures, or characteristics described may be combined in various ways in one or more embodiments. In general, of course, these and other issues may vary with the particular context of usage. Therefore, the particular context of the description or the usage of these terms may provide helpful guidance regarding inferences to be drawn for that context.

What is claimed is:

1. A system for processing requests to execute a program code on a network-accessible services system, the system comprising:
   an electronic data store configured to store:
      a first record comprising information for identifying, in an event message having a first schema, a reference to a data object that is external to the event message, the information provided to the system from a user input entered by a user in response to a prompt to enter one or more handling rules; and a second record comprising a first address of a first cache storage accessible by a server computer, of the network-accessible services system, that retrieves data from the first cache storage in a first amount of time that is less than a second amount of time required for the server computer to retrieve the data from a first data store; and a computing system comprising one or more hardware computing devices executing specific computer-executable instructions and in communication with the electronic data store, with a user device via a communication network, and with a request processing module of the network-accessible services system, the instructions, when executed, causing the computing system to:

receive, from the request processing module in response to a detection that a preset maximum number of instances of the program code are concurrently executing in the network-accessible services system, a first event message associated with a first event designated to trigger execution of the program code;

compare the first record to the first event message to identify a first data object associated with the first event and stored in the first data store;

using the second record, store the first data object in the first cache storage;

set an indicator in the first event message to a first value, the program code, when executed by the server computer, causing the server computer to:
determine that the indicator is set to the first value; and
responsive to determining that the indicator is set to the first value, retrieve the first data object from the first cache storage; and in response to a second event message, cause the program code to be executed on the server computer.

2. The system of claim 1, wherein the electronic data store is further configured to store a third record comprising a data parameter and a value of the data parameter, the value describing an eligibility of the data object for storage in the first cache storage, the data parameter and the value provided to the system from the user input, and wherein the computing system further includes instructions that upon execution cause the computing system to, before storing the first data object in the first cache storage:

use the third record to determine a second value of a first parameter of the first data object; and use the third record to determine that the second value corresponds to the value indicating that the first data object is eligible for storage in the first cache storage.

3. The system of claim 1, wherein the computing system further includes memory accessible by the one or more hardware computing devices, the memory storing the instructions, a first queue for storing event messages that reference the first data object, and a second queue for storing event messages that do not reference the first data object, the instructions upon execution further causing the computing system to:

receive, from the request processing module in response to the detection that the preset maximum number of instances of the program code are concurrently executing in the network-accessible services system, a third event message associated with a second event designated to trigger execution of the program code;

compare the first record to the third event message to determine that the third event message does not contain a second reference corresponding to the reference of the first record;

store the third event message in the second queue;

subsequent to delivering the first event message to the request processing module, receive, from the request processing module, a request for a queued event message; and responsive to receiving the request:
determine that the first queue does not contain any event messages ready for delivery;
determine that the third event message is first in the second queue; and
deliver the third event message to the request processing module.

4. The system of claim 1, wherein the electronic data store is further configured to store a third record comprising a second address of a second cache storage remote from the first cache storage, and wherein to store the first data object in the first cache storage, the computing system further including instructions that upon execution cause the computing system to:

determine a first access metric describing latency of transmissions between an instance of the program code and the first cache storage;

determine a second access metric describing latency of transmissions between the instance of the program code and the second cache storage; and compare the first access metric to the second access metric to determine that latency of transmissions between the instance of the program code and the first cache storage is less than latency of transmissions between the instance of the program code and the second cache storage.

5. The system of claim 1, wherein the network-accessible services system is a first network-accessible services system of a plurality of network-accessible services systems, and wherein to store the first data object in the first cache storage, the instructions upon execution further cause the computing system to:

identify a first parameter of the first event message, the first parameter associated with a corresponding capacity of each of the plurality of network-accessible services systems to process the first event via execution of the program code by a corresponding server computer of the network-accessible services system; and determine that a parameter value of the first parameter indicates that the first network-accessible services system will process the first event in less time than each other network-accessible services system of the plurality of network-accessible services systems.

6. A system, comprising:

a message queue service comprising one or more hardware computing devices executing specific computer-executable instructions that, when executed, cause the message queue service to at least:

receive a first request to queue a first event message that triggers execution of a program code of a user on a network-accessible services system, the first request including the first event message;

responsive to the first request and prior to execution of the program code to process the first event message:
identify, based at least on the first request, a first data object that the program code will access during execution to process the first event message;
obtain the first data object from a first data store containing the first data object; and
store the first data object in a first cache storage associated with the network-accessible services system;

receive a second request to deliver a queued event message; and responsive to receiving the second request, deliver the first event message to the network-accessible services system, such that the program code, when executed by a computer server of the network-accessible services system to process the first event message, causes the computer server to retrieve the first data object from the first cache storage.

7. The system of claim 6, further comprising:

a user interface module executing specific computer-executable instructions that, when executed, cause the user interface module to send a user interface to a user device in communication with the system, the user interface enabling a user of the user device to enter user input and send the user input to the system, the user input comprising one or more handling rules;

wherein the message queue service further includes instructions that upon execution cause the message queue service to identify the first data object based further on a first handling rule of the one or more handling rules.

8. The system of claim 7, wherein the first handling rule includes a data object parameter and a plurality of values of the data object parameter, and wherein the message queue service further includes instructions that upon execution cause the message queue service to, before obtaining the first data object from the first data store, determine that a first value of a first parameter of the first data object is one of the plurality of values.

9. The system of claim 7, wherein:

the one or more handling rules further comprise a second handling rule;

the first handing rule includes a data object parameter, a first range of values of the data object parameter, and a first indicator that the first handling rule is associated with the first cache storage;

the second handling rule includes the data object parameter, a second range of values of the data object parameter, and a second indicator that the second handling rule is associated with a second cache storage remote from the first cache storage; and to store the first data object in the first cache storage, the message queue service further includes instructions that upon execution cause the message queue service to determine that a first value of a first parameter of the first data object is within the first range of values.

10. The system of claim 9, wherein the data object parameter is a file size, and the first range of values is associated with smaller file sizes than the second range of values.

11. The system of claim 6, wherein to store the first data object in the first cache storage, the message queue service further includes instructions that upon execution cause the message queue service to:

determine a first latency of transmissions between an instance of the program code and the first cache storage;

determine a second latency of transmissions between the instance of the program code and a second cache storage; and determine that the first latency is less than the second latency.

12. The system of claim 6, wherein the-message queue service further includes instructions that upon execution cause the message queue service to:

store in a first queue all of the requests to execute the program code received by the message queue service; and determine that the first request is ready for delivery to the network-accessible services system before delivering the first request to the network-accessible services system.

13. The system of claim 6, wherein the message queue service further includes instructions that upon execution cause the message queue service to:

store in a first queue a first subset of a plurality of requests to execute the program code received by the message queue service, the first subset comprising each request of the plurality of requests that is associated with corresponding data that the program code obtains during execution in order to process the request, the first subset including the first request; and store in a second queue a second subset of the plurality of requests, the second subset comprising each request of the plurality of requests that is ready to be delivered to the network-accessible services system upon receipt by the message queue service.

14. The system of claim 6, wherein the instructions upon execution cause the message queue service to implement, on the one or more hardware computing devices:

a queuing module comprising the instructions that cause the message queue service to:

place a plurality of received event messages in a second queue, a first received event message of the plurality of received event messages being associated with the first request; and retrieve a plurality of ready event messages from the first queue, a first ready event message of the plurality of received event messages being associated with the first request; and a pre-fetch module comprising the instructions that cause the message queue service to:

retrieve each of the plurality of received event messages from the second queue;

convert each received event message of the plurality of received event messages into a corresponding ready event message of the plurality of ready event messages; and place each of the plurality of ready event messages in the first queue;

wherein to convert the first received event message into the first ready event message, the instructions associated with the pre-fetch module upon execution cause the message queue service to identify the first data object, obtain the first data object from the first data store, and store the first data object in the first cache storage.

15. The system of claim 14, wherein the first received event message includes a first data reference indicating that the first data object is located in the first data store, and wherein to convert the first received event message into the first ready event message, the message queue service further includes instructions that upon execution cause the pre-fetch module to generate the first ready event message to include a second data reference that replaces the first data reference, the second data reference indicating that the first data object is located in the first cache storage.

16. The system of claim 6, wherein the first cache storage is a distributed memory caching system contained within the network-accessible services system, and wherein the message queue service further includes instructions that upon execution cause the message queue service to store a second data object in a second cache storage comprising a file system of the one or more hardware computing devices.

\* \* \* \* \*

UNITED STATES PATENT AND TRADEMARK OFFICE
CERTIFICATE OF CORRECTION

| | | |
|---|---|---|
| PATENT NO. | : 10,530,887 B1 | Page 1 of 1 |
| APPLICATION NO. | : 15/371107 | |
| DATED | : January 7, 2020 | |
| INVENTOR(S) | : Mehr | |

It is certified that error appears in the above-identified patent and that said Letters Patent is hereby corrected as shown below:

On the Title Page

Item (12) replace "Mehr" with --Sharifi Mehr--.

Signed and Sealed this
Fourth Day of February, 2020

Andrei Iancu
*Director of the United States Patent and Trademark Office*